US008872808B2

(12) United States Patent
Ueno et al.

(10) Patent No.: US 8,872,808 B2
(45) Date of Patent: Oct. 28, 2014

(54) DRIVING INTEGRATED CIRCUIT AND ELECTRONIC APPARATUS

(75) Inventors: Katsutoshi Ueno, Chino (JP); Akira Morita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 350 days.

(21) Appl. No.: 13/417,041

(22) Filed: Mar. 9, 2012

(65) Prior Publication Data

US 2012/0229432 A1 Sep. 13, 2012

(30) Foreign Application Priority Data

Mar. 10, 2011 (JP) ................................ 2011-052603

(51) Int. Cl.
*G06F 3/038* (2013.01)
*G09G 3/36* (2006.01)

(52) U.S. Cl.
CPC ...... *G09G 3/3688* (2013.01); *G09G 2310/0297* (2013.01); *G09G 2370/14* (2013.01); *G09G 2370/08* (2013.01)
USPC .......................................................... 345/204

(58) Field of Classification Search
None
See application file for complete search history.

(56) References Cited

U.S. PATENT DOCUMENTS

| | | | | |
|---|---|---|---|---|
| 8,018,418 | B2 * | 9/2011 | Tsao et al. | 345/98 |
| 8,537,153 | B2 * | 9/2013 | Wu | 345/214 |
| 2004/0183769 | A1 * | 9/2004 | Schreyer et al. | 345/99 |
| 2009/0244036 | A1 | 10/2009 | Morita | |
| 2010/0097358 | A1 * | 4/2010 | Totoki | 345/204 |
| 2010/0309182 | A1 * | 12/2010 | Kim et al. | 345/208 |

FOREIGN PATENT DOCUMENTS

JP 2009-238892 A 10/2009

* cited by examiner

*Primary Examiner* — Joseph Haley
*Assistant Examiner* — Emily Frank
(74) *Attorney, Agent, or Firm* — Maschoff Brennan

(57) ABSTRACT

A first receiver receives a clock. A second receiver receives a differential type image signal. An image signal receiving unit performs sampling the differential type image signal by the clock, and generates an image signal driving an electro-optic device. A third receiver receives a time multiplexed control signal. A reception buffer performs sampling of the time multiplexed control signal by the clock and the stores the time multiplexed control signal. A driving control unit performs a driving control of the electro-optic device on the basis of the stored time multiplexed control signal.

19 Claims, 13 Drawing Sheets

FIG. 7

| PN | U[1] | U[2] | U[3] | | U[K−2] | U[K−1] | U[K] |
|---|---|---|---|---|---|---|---|
| 0 | 1 | 2 | 3 | ······ | K−2 | K−1 | K |
| 1 | K | 1 | 2 | ······ | K−3 | K−2 | K−1 |
| 2 | K−1 | K | 1 | ······ | K−4 | K−3 | K−2 |
| ⋮ | ⋮ | ⋮ | ⋮ | ⋱ | ⋮ | ⋮ | ⋮ |
| K−2 | 3 | 4 | 5 | ······ | K | 1 | 2 |
| K−1 | 2 | 3 | 4 | ······ | K−1 | K | 1 |

DRIVING INTEGRATED CIRCUIT AND ELECTRONIC APPARATUS

BACKGROUND

1. Technical Field

The present invention relates to a driving integrated circuit very suitable for an electro-optic device such as a liquid crystal panel, and an electronic apparatus using the same.

2. Related Art

As is well known, an electro-optic device such as a liquid crystal panel is provided with pixel circuits corresponding to intersections of a plurality of signal lines and a plurality of scanning lines. In such an electro-optic device, it is necessary to complete writing of image signals into all the pixel circuits corresponding to one scanning line within one horizontal scanning period. For this reason, as the electronic apparatus using the electro-optic device, various apparatuses provided with a driving integrated circuit receiving an image signal through a high speed differential interface and driving an electro-optic device have been proposed (e.g., see JP-A-2009-238892).

However, the driving integrated circuit of the related art receives the image signal through the differential interface, and receives a control signal such as a synchronization signal through a single-end serial interface, to perform driving of the electro-optic device. For this reason, the driving integrated circuit of the related art has a large number of terminals, and there is a problem in that an erroneous operation easily occurs by noise. In addition, the driving integrated circuit of the related art has a large number of terminals and erroneous operation easily occurs due to noise, and thus there is a problem in that the design and production of a substrate for mounting the driving integrated circuit are difficult.

SUMMARY

An advantage of some aspects of the invention is to provide a driving integrated circuit that has a small number of terminals, receives an image signal and a control signal necessary to drive an electro-optic device at high speed, drives the electro-optic device, and is excellent in terms of noise resistance.

According to an aspect of the invention, there is provided a driving integrated circuit including: a first receiver that receives a differential type pixel clock; a second receiver that receives a differential type image signal synchronized with the pixel clock; a third receiver that receives a time multiplexed control signal which is the differential type signal synchronized with the pixel clock and is obtained by time-multiplexing a plurality of control signals; and a control circuit that receives the image signal through the second receiver by synchronized with the pixel clock received by the first receiver, generates an image signal driving an electro-optic device, receives the time multiplexed control signal through the third receiver by synchronized with the pixel clock received by the first receiver, extracts the plurality of control signals from the time multiplexed control signal, and performs a driving control of the electro-optic device.

According to the aspect of the invention, since the control signal supplied to the driving integrated circuit is a differential type signal, it is possible to improve noise resistance, to reduce production defects in the driving integrated circuit, and to improve transmission speed. In addition, since the signal obtained by time-multiplexing the plurality of control signals is supplied to the driving integrated circuit, it is possible to reduce the number of signal lines for transmitting the signal to the driving integrated circuit and to reduce the number of terminals of the driving integrated circuit.

In the driving integrated circuit, the control circuit may include a unit that extracts a control signal indicating a vertical synchronization timing of the electro-optic device as the control signal from the time multiplexed control signal and generates a vertical synchronization signal for the electro-optic device.

In the driving integrated circuit, the control circuit may include a unit that extracts a control signal indicating a horizontal synchronization timing of the electro-optic device as the control signal from the time multiplexed control signal and generates a horizontal synchronization signal for the electro-optic device.

With such a configuration, the control signal indicating the timing of the vertical synchronization or the horizontal synchronization is supplied as a part of the time multiplexed control signal from a master device to the driving integrated circuit, and thus it is possible to perform the horizontal synchronization or the vertical synchronization of the electro-optic device. With such a configuration, since the control signal indicating the timing of the horizontal synchronization or the vertical synchronization is transmitted as a differential type signal to the driving integrated circuit, it is possible to receive the control signal in a state where noise is canceled in the driving integrated circuit even when the noise is overlapped with the control signal in the transmission course. Accordingly, it is possible to prevent the horizontal synchronization or the vertical synchronization at a false timing due to the influence of noise.

In the driving integrated circuit, the control circuit may include a unit that extracts a command designating a driving mode of the electro-optic device within a vertical scanning period or a horizontal scanning period from the time multiplexed control signal and perform a driving control of the electro-optic device in the driving mode indicated by the extracted command.

As a specific example, the electro-optic device includes a plurality of pixel circuits including a pixel electrode and a common electrode to which a gradation voltage based on the pixel signal is applied, and an electro-optic element interposed between the pixel electrode and the common electrode. The control circuit extracts a command indicating a polarity of the gradation voltage which is applied to the pixel electrode and the common electrode as the command designating the driving mode of the electro-optic device from the time multiplexed control signal, and performs a control of the electro-optic device for applying the gradation voltage of the polarity indicated by the extracted command between the pixel electrode and the common electrode.

As another specific example, the electro-optic device includes a plurality of pixel circuits including a pixel electrode and a common electrode to which a gradation voltage based on the pixel signal is applied, and an electro-optic element interposed between the pixel electrode and the common electrode. The control circuit extracts a command indicating gradation inversion as the command designating the driving mode of the electro-optic device from the time multiplexed control signal, and performs a control of the electro-optic device for applying a gradation voltage representing the gradation obtained by inverting the gradation indicated by the image signal between the pixel electrode and the common electrode.

As still another specific example, the control circuit extracts a command indicating vertical inversion display as the control signal designating the driving mode of the electro-optic device from the time multiplexed control signal, and performs a control for displaying an image obtained by vertically inverting an image indicated by the image signal on the electro-optic device.

As still another specific example, the control circuit extracts a command indicating horizontal inversion display as the command designating the driving mode of the electro-optic device from the time multiplexed control signal, and performs a control for displaying an image obtained by horizontally inverting an image indicated by the image signal on the electro-optic device.

With such a configuration, the time multiplexed control signal obtained by time-multiplexing various control signals is supplied to the driving integrated circuit through a pair of signal lines, and thus it is possible to perform various kinds of driving control of the electro-optic device in the driving integrated circuit.

In the driving integrated circuit, the control circuit may include a unit that performs a periodical update control of a driving condition of the electro-optic device, and a synchronization unit that extracts a synchronization command designating the content of the driving condition that is a target of the periodical update control as a command designating the driving mode of the electro-optic device, and sets the content of the driving condition that is the target of the periodical update control to the content indicated by the extracted synchronization command.

With such a configuration, the synchronization command is supplied to the driving integrated circuit, and thus it is possible to set the content of the driving condition that is the periodical update control target performed by the driving integrated circuit to a desired content.

As still another specific example of the aspect, there is the following. That is, the electro-optic device may include a pixel unit that includes a plurality of scanning lines and a plurality of signal lines intersecting with each other and including a plurality of pixel circuits disposed corresponding to the intersections of the plurality of scanning lines and the plurality of signal lines, and a scanning line driving circuit that sequentially selects the plurality of scanning lines within one vertical scanning period and connects the plurality of pixel circuits corresponding to the intersections of the selected scanning lines and the plurality of signal lines to the plurality of signal lines. The driving integrated circuit may include a signal line driving circuit that divides the plurality of signal lines into a plurality of wiring blocks, sequentially selects the signal lines belonging to the wiring block within one horizontal scanning period for each wiring block, and applies the gradation voltage to the selected signal line. The control circuit of the driving integrated circuit may include a unit that performs a periodical update control of a sequence of applying the gradation voltage to the plurality of signal lines in the wiring block of the plurality of wiring blocks, and a synchronization unit that extracts a synchronization command designating the sequence of applying the gradation voltage to the plurality of signal lines as a command designating the driving mode of the electro-optic device and sets the sequence of applying the gradation voltage to the plurality of signal lines that are the target of the periodical update control to the application sequence indicated by the extracted synchronization command.

According to the aspect, the synchronization command is supplied to the driving integrated circuit, and thus it is possible to set the sequence of applying the gradation voltage to the plurality of signal lines that are the target of the periodical update control performed on the driving integrated circuit, to the application sequence indicated by the synchronization command.

In the driving integrated circuit, the command may include an address representing a kind of driving condition and data representing a driving content in the driving condition, and the control circuit may extract only the command having a predetermined address from the time multiplexed control signal.

In the aspect, since the control circuit extracts only the command having the predetermined address from the time multiplexed control signal, it is possible to further increase the noise resistance.

In the driving integrated circuit, the control circuit may extract a control signal by concatenating an additional signal and the horizontal synchronization signal designating the driving mode of the electro-optic device, supply the horizontal synchronization signal to the electro-optic device, and perform a driving control of the electro-optic device in the driving mode indicated by the additional signal included in the control signal in the next horizontal scanning period of the horizontal scanning period started by the horizontal synchronization signal. In the driving integrated circuit, the control circuit may extract a control signal by concatenating an additional signal designating the driving mode of the electro-optic device and the horizontal synchronization signal, supply the horizontal synchronization signal to the electro-optic device, and perform a driving control of the electro-optic device in the driving mode indicated by the additional signal included in the control signal in the horizontal scanning period started by the horizontal synchronization signal.

In the aspect, for example, the additional signal is a signal designating the scanning line that is the driving target of the plurality of scanning lines provided in the electro-optic device. With such a configuration, it is possible to change over the content of the driving control performed by synchronized with the horizontal scanning period by the transmission of the additional signal.

In the driving integrated circuit, the control circuit may extract a control signal by concatenating an additional signal and the vertical synchronization signal designating the driving mode of the electro-optic device, supply the vertical synchronization signal to the electro-optic device, and perform a driving control of the electro-optic device in the driving mode indicated by the additional signal included in the control signal in the next vertical scanning period of the vertical scanning period started by the vertical synchronization signal. In the driving integrated circuit, the control circuit may extract a control signal by concatenating an additional signal designating the driving mode of the electro-optic device and the vertical synchronization signal, supply the vertical synchronization signal to the electro-optic device, and perform a driving control of the electro-optic device in the driving mode indicated by the additional signal included in the control signal in the vertical scanning period started by the vertical synchronization signal. With such a configuration, it is possible to change over the content of the driving control performed by synchronized with the vertical scanning period by the transmission of the additional signal.

In the driving integrated circuit, the control circuit may include a unit that extracts various commands from the time multiplexed control signal and drives the electro-optic device according to the extracted commands, and output a vertical synchronization signal to the electro-optic device according to the extraction of the command indicating the vertical synchronization timing of the electro-optic device.

In the driving integrated circuit, the control circuit may include a unit that extracts various commands from the time multiplexed control signal and drives the electro-optic device according to the extracted commands, and output a vertical synchronization signal to the electro-optic device according to the extraction of the command indicating the vertical synchronization timing of the electro-optic device.

In the aspect, it is possible to supply a wide-scope control signal also including the control signal instructing generation of the horizontal synchronization signal or the vertical synchronization signal as the command to the driving integrated circuit.

In the driving integrated circuit, the control circuit may include a unit that stops supplying power to the second receiver until a next horizontal scanning period is started when the reception of the image signal of one horizontal scanning period by the second receiver is completed during one horizontal scanning period.

According to the aspect, the supply of power to the second receiver within the period when the image signal is not supplied is stopped, and thus it is possible to reduce power consumption of the driving integrated circuit.

According to another aspect of the invention, there is provided an electronic apparatus including: an electro-optic device; the driving integrated circuit that performs the driving control of the electro-optic device according to the aspect; and a host CPU that supplies the pixel clock, an image signal, and the time division multiplexed control signal to the driving integrated circuit.

According to the aspect of the invention, it is possible to improve noise resistance, to reduce production defects, and to improve the transmission speed of the control signal from the host CPU to the driving integrated circuit in the driving integrated circuit. In addition, since the signal obtained by time multiplexing the plurality of control signals is supplied to the driving integrated circuit, it is possible to reduce the number of signal lines for transmitting the signal from the host CPU to the driving integrated circuit, and to reduce the number of terminals of the driving integrated circuit.

BRIEF DESCRIPTION OF THE DRAWINGS

The invention will be described with reference to the accompanying drawings, wherein like numbers reference like elements.

FIG. 7 is a diagram illustrating an example of contents of selection pattern data stored in a pattern generator of the control circuit.

DESCRIPTION OF EXEMPLARY EMBODIMENTS

First Embodiment

Figure 1:
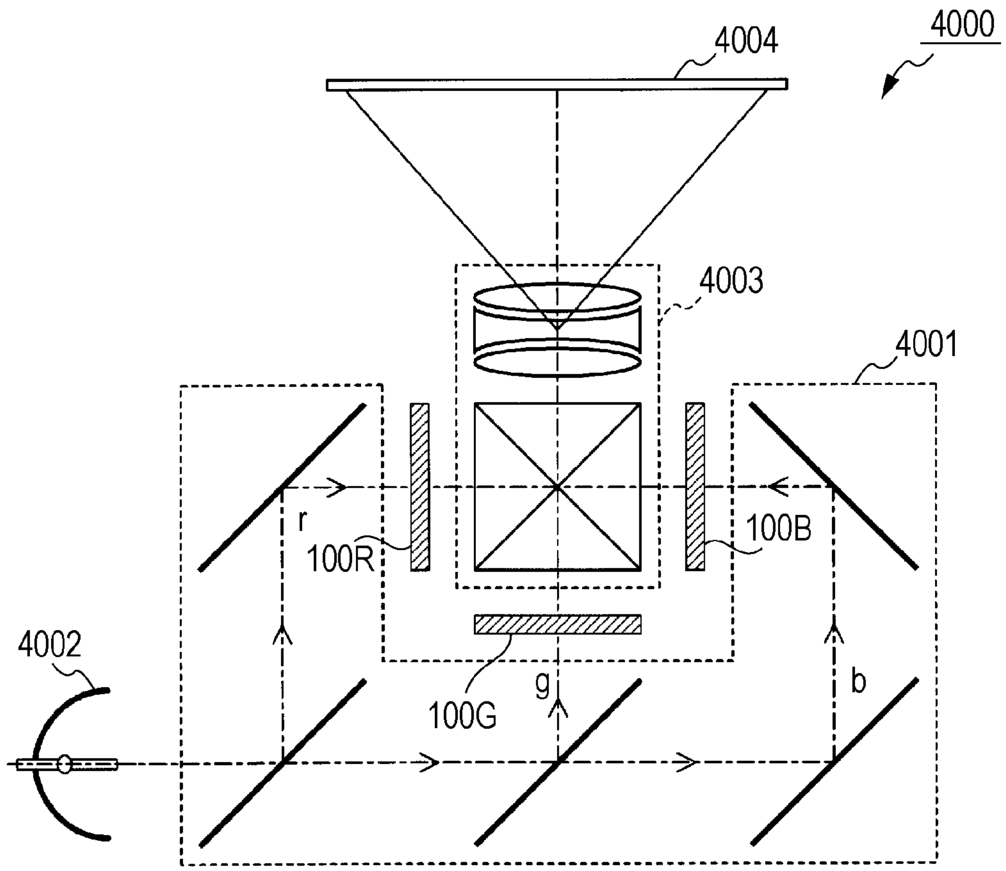
FIG. 1 is a schematic diagram illustrating a configuration of a projection type display device to which a driving integrated circuit according to a first embodiment of the invention is applied.

FIG. 1 is a schematic diagram illustrating a projection type display device (3-plate type projector) 4000 that is an application of a driving integrated circuit according to a first embodiment of the invention. The projection type display device 4000 includes three electro-optic devices 100 (100R, 100G, and 100B) corresponding to different display colors R, G, and B that forms an image. A lighting optical system 4001 supplies a red component r of light emitted from a lighting device (light source) 4002 to the electro-optic device 100R, supplies a green component g to the electro-optic device 100G, and supplies a blue component b to the electro-optic device 100B. Each electro-optic device 100 serves as an optical modulator (light valve) modulating single color light supplied from a lighting optical system 4001 according to a display image. A projection optical system 4003 synthesizes the light emitted from the electro-optic devices 100 and projects the light on a projection face 4004.

Figure 2:
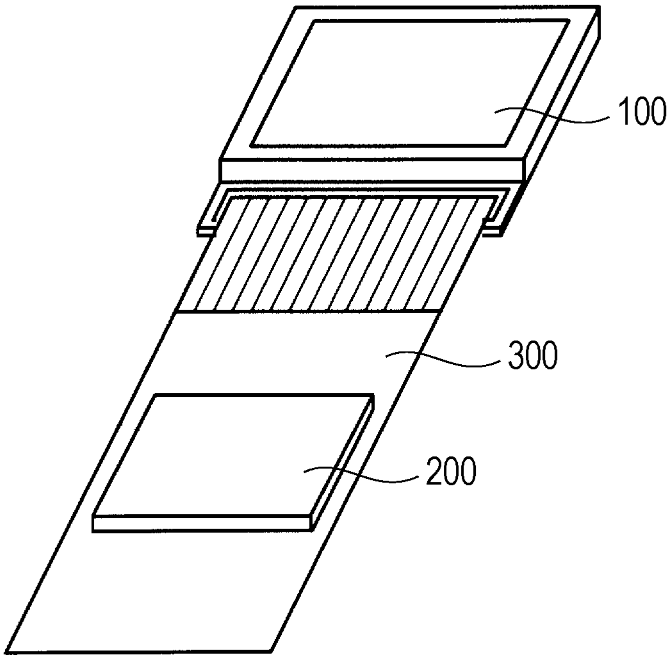
FIG. 2 is a perspective view illustrating a state where an electro-optic device and the driving integrated circuit are connected through a flexible circuit board in the embodiment.

FIG. 2 is a diagram illustrating a configuration of a signal transmission system for one electro-optic device 100 in the projection type display device 4000. As shown in FIG. 2, the projection type display device 4000 has a flexible circuit board 300 mounted on a driving integrated circuit 200 according to a first embodiment of the invention. The electro-optic device 100 is connected to a host CPU (not shown) through the flexible circuit board 300 and the driving integrated circuit 200. The driving integrated circuit 200 is a device receiving image signals and various control signals for driving control from the host CPU through the flexible circuit board 300, and driving the electro-optic device 100 through the flexible circuit board 300.

Figure 3:
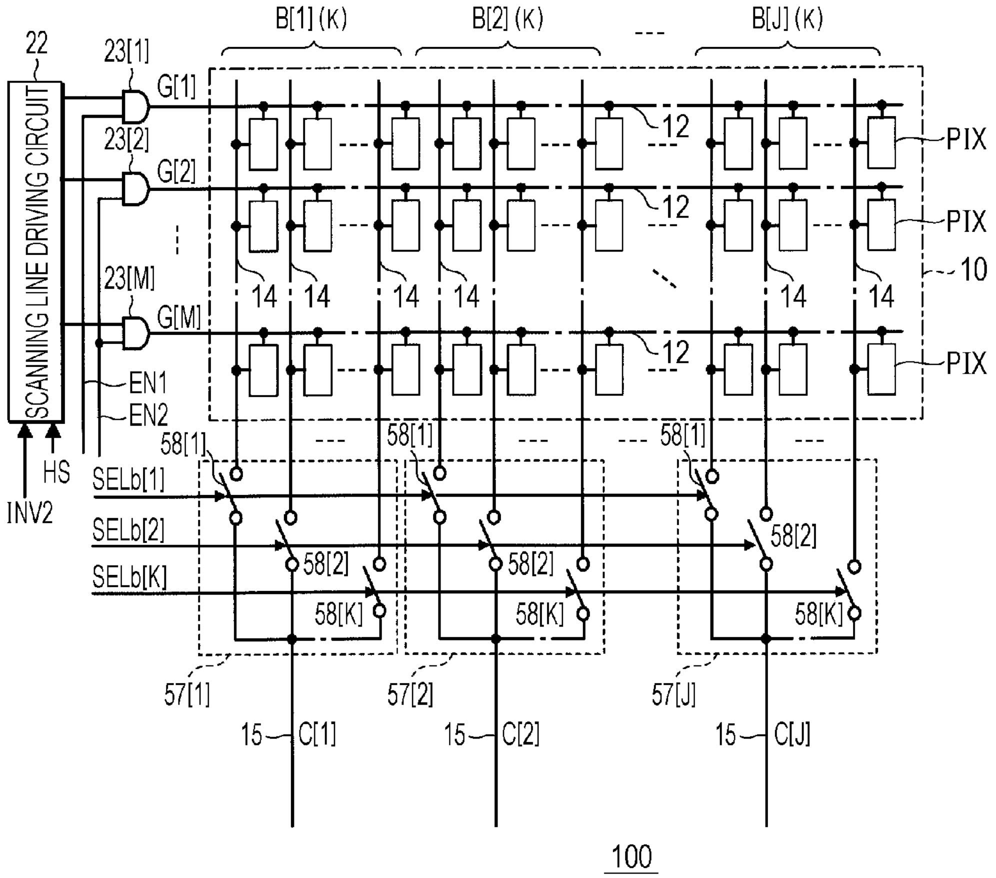
FIG. 3 is a block diagram illustrating a configuration of the electro-optic device in the embodiment.

FIG. 3 is a block diagram illustrating a configuration of the electro-optic device 100. As shown in FIG. 3, the electro-optic device 100 has a pixel unit 10, a scanning line driving circuit 22, and J demultiplexers 57[11] to 57[J].

The pixel unit 10 is provided with M scanning lines 12 and N signal lines 14 (M and N are natural numbers). The plurality of pixel circuits PIX are provided corresponding to intersections of the scanning lines 12 and the signal lines 14, and are arranged in a matrix of longitudinal M rows×transverse N columns.

Figure 4:
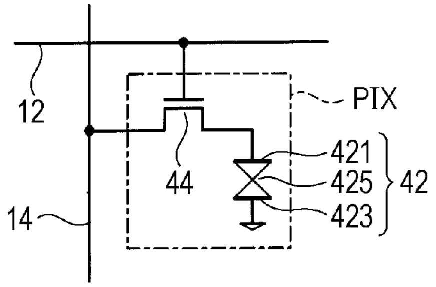
FIG. 4 is a circuit diagram illustrating a configuration of the electro-optic device.

FIG. 4 is a circuit diagram illustrating a configuration of each pixel circuit PIX. As shown in FIG. 4, each pixel circuit PIX includes a liquid crystal element 42, and a selection switch 44. The liquid crystal element 42 is an electro-optic element formed of a pixel electrode 421 and a common electrode 423 opposed to each other, and a liquid crystal 425 between both electrodes. The transmissivity of the liquid crystal 425 is changed according to voltage applied between the pixel electrode 421 and the common electrode 423. In the following description, for convenience, when the potential of the pixel electrode 421 is higher than that of the common electrode 423, the application voltage of the liquid crystal element 42 is referred to as positive polarity, and when the potential of the pixel electrode 421 is lower than that of the common electrode 423, the application voltage is referred to as negative polarity.

The selection switch 44 is formed of an N-channel thin film transistor, in which a gate is connected to the scanning line 12, and controls the electrical connection (connection/disconnection) of both between the liquid crystal element 42 (pixel electrode 421) and the signal line 14. Accordingly, the pixel circuit PIX (liquid crystal element 42) displays a gradation corresponding to voltage (gradation voltage VG to be described later) of the signal line 14 when the selection switch 44 is turned on.

The above description is a configuration of each pixel circuit PIX in FIG. 3.

In FIG. 3, M AND gates 23[1] to 23[M] for changing over whether or not scanning signals G[1] to G[M] output by the scanning line driving circuit 22 are output to each of M scanning lines 12 are provided between the scanning line driving circuit 22 and M scanning lines 12. An enable signal EN1 is given to an odd-number AND gate 23[m] (m is an odd number) of M AND gates 23[1] to 23[M], and an enable signal EN2 is given to an even-number AND gate 23[m] (m is an even number).

The scanning line driving circuit 22 sequentially sets the scanning signals G[1] to G[M] for the scanning lines 12 to an active level by one horizontal scanning period H according to the output of an internal horizontal synchronization signal HS. The internal horizontal synchronization signal HS is supplied from the driving integrated circuit 200 through the flexible circuit board 300 with the enable signals EN1 and EN2.

When all the enable signals EN1 and EN2 are at the active level, the scanning signals G[1] to G[M] output by the scanning lines driving circuit 22 are output to M scanning lines 12 through the AND gates 23[1] to 23[M]. Accordingly, M scanning lines 12 are sequentially selected.

Meanwhile, when the enable signal EN1 is at the active level and the enable signal EN2 is at the inactive level, the scanning line G[m] (m) (m is an odd number) is output to only the odd-number scanning line 12. When the enable signal EN1 is at the inactive level and the enable signal EN2 is at the active level, the scanning line G[m] (m) (m is an even number) is output to only the even-number scanning line 12. In such a case, the scanning lines 12 are sequentially selected one by one.

The scanning signal G[m] corresponding to the m-th row is at the active level, the selection switches 44 of N pixel circuits PIX of the m-th row are turned on in the period when the scanning line corresponding to the row is selected, and N signal lines 14 are connected the pixel electrodes 421 of N pixel circuits PIX of the m-th row through the selection switches 44, respectively.

N signal lines 14 in the pixel unit 10 are classified into J wiring blocks B[1] to B[J] as a unit of K (K is a natural number equal to or more than 2) adjacent to each other (J=N/K). The demultiplexers 57[11] to 57[J] correspond to J wiring blocks B[1] to B[J], respectively.

Each of the demultiplexers 57[j] (j=1 to J) is formed of K switches 58[1] to 58[K]. One contact point of each of the K switches 54[1] to 54[K] is commonly connected to each of the demultiplexers 57[j] (j=1 to J). The common connection point of one contact point of K switches 54[1] to 54[K] of each of the demultiplexers 57[j] (j=1 to J) is connected to each of J signal lines 15. J signal lines 15 are connected to the driving integrated circuit 200 through the flexible circuit board 300. In each of the demultiplexers 57[j] (j=1 to J), one contact point of each of K switches 54[1] to 54[K] is connected to each of K signal lines 14 constituting the wiring blocks B[j] corresponding to the demultiplexers 57[j].

ON/OFF of K switches 58[1] to 58[K] of the demultiplexers 57[j] (j=1 to J) is switched by K selection signals SELb[1] to SELb[K]. K selection signals SELb[1] to SELb[K] are supplied from the driving integrated circuit 200 through the flexible circuit board 300. For example, when one selection signal SELb[k] is at the active level and the other K−1 selection signals SELb[k'] (k'≠k) are at the inactive level, only J switches 58[k] belonging to each of the demultiplexers 57[j] (j=1 to J) are turned on. Accordingly, each of the demultiplexers 57[j] (j=1 to J) outputs signal line driving signals C[1] to C[J] on J signal lines 15 to the k-th signal line 14 of the wiring blocks B[1] to B[J].

The above description is the configuration of the electro-optic device 100.

Figure 5:
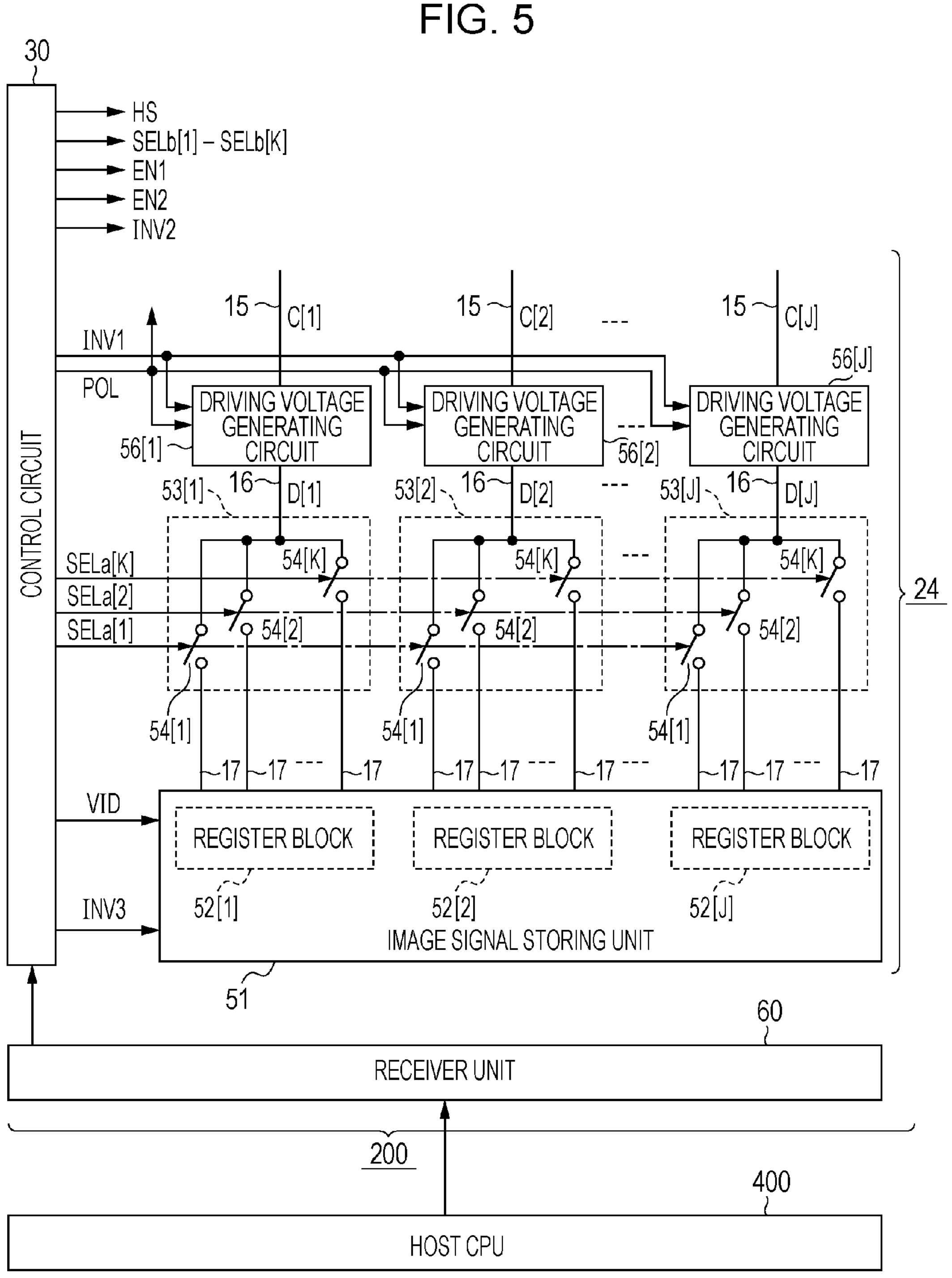
FIG. 5 is a block diagram illustrating a configuration of the driving integrated circuit according to the embodiment.

FIG. 5 is a block diagram illustrating a configuration of the driving integrated circuit 200. In FIG. 5, to make the role of the driving integrated circuit 200 easily understood, the host CPU 400 connected to the driving integrated circuit 200 through the flexible circuit board 300 is shown.

As shown in FIG. 5, the driving integrated circuit 200 has a signal line driving circuit 24, a control circuit 30, and a receiver unit 60. As described above, N signal lines 14 in the pixel unit 10 of the electro-optic device 100 are classified into J wiring blocks B[1] to B[J]. The signal line driving circuit 24 in the driving integrated circuit 200 is provided with J driving voltage generating circuits 56[1] to 56[J] and J multiplexers 53[1] to 53[J], corresponding to J wiring blocks B[1] to B[J]. The signal line driving circuit 24 is provided with an image signal storing unit 51. The image signal storing unit 51 includes N registers (not shown) storing digital type image signals VID of N pixels constituting one line. N registers are classified into register blocks 52[1] to 52[J] formed of K(=N/J) registers, corresponding to J wiring blocks B[1] to B[J].

Each of the multiplexers 53[j] (j=1 to J) is formed of K switches 54[1] to 54[K]. Paying attention to one multiplexer 53[j] corresponding to the j-th wiring block B[j], each image signal of K pixels stored in the j-th register block 52[j] is supplied to one contact point of each of K switches 54[1] to 54[K] through K signal lines 17. One contact point of each of the K switches 54[1] to 54[K] is commonly connected to one signal line 16, and is connected to an input terminal of the j-th driving voltage generating circuit 56[j] through the same signal line 16.

ON/OFF of K switches 54[1] to 54[K] of the multiplexers 53[j] (j=1 to J) is switched by K selection signals SELa[1] to SELa[K] output by the control circuit 30. When one selection signal SELa[k] is at the active level and the other K-1 selection signals SELa[k'] (k'≠k) are at the inactive level, only J switches 54[k] belonging to each of the multiplexers 53[j] (j=1 to J) are turned on. Accordingly, each of the multiplexers 53[j] (j=1 to J) selects the image signal of the k-th pixel of the image signals of horizontal direction K pixels stored in the corresponding register block 52[j] as the image signal D[j], and supplies the image signal to the driving voltage generating circuit 56[j] through the signal line 16.

The driving voltage generating circuits 56[1] to 56[J] have a function of generating a pre-charge voltage, and a function of generating a gradation voltage corresponding to each of the image signals D[1] to D[J] supplied through the signal line 16. One horizontal scanning period H is divided into a pre-charge period TPRE and a writing period TWRT, and the driving voltage generating circuits 56[1] to 56[J] outputs the pre-charge voltage in the pre-charge period TPRE and outputs the gradation voltage corresponding to the image signals D[1] to D[J] in the writing period, as the signal line driving signals C[1] to C[J] to J signal lines 15. J signal lines are formed on the flexible circuit board 300, and are connected to the input terminals of the demultiplexers 57[11] to 57[J] in the electro-optic device 100 described above.

The receiver unit 60 is a circuit receiving image signals and various control signals from the host CPU 400 through a differential serial interface and leading the signals to the control circuit 30. The control circuit 30 is a circuit performing control of the signal line driving circuits 24 and circuits in the electro-optic device 100 on the basis of the reception signals of the receiver unit 60.

Figure 6:
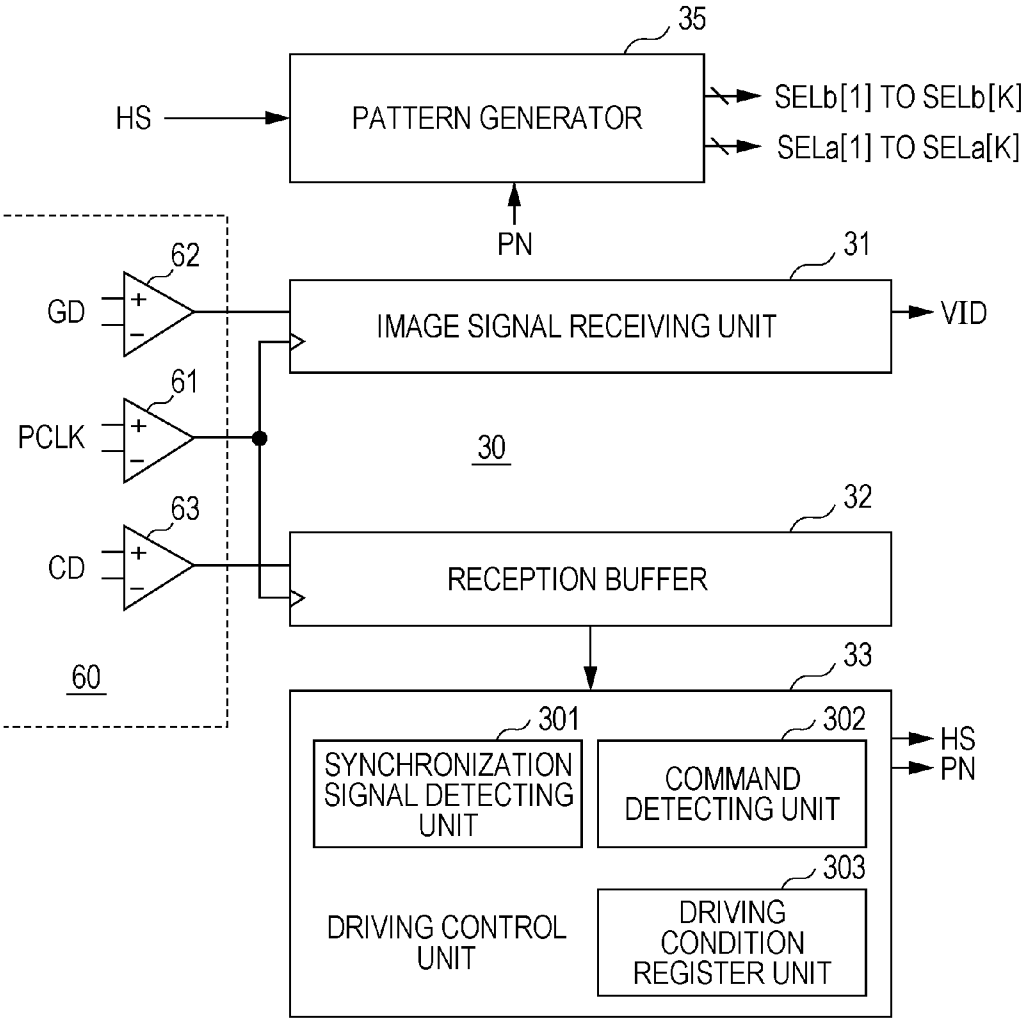
FIG. 6 is a block diagram illustrating a configuration of a control circuit and a receiver unit of the driving integrated circuit.

FIG. 6 is a block diagram illustrating a configuration of the receiver unit 60 and the control circuit 30. The receiver unit 60 has three kinds of receivers 61, 62, and 63 each formed of a differential amplifier. In the embodiment, the host CPU 400 (see FIG. 5) supplies a differential type pixel clock PCLK and supplies a differential type image signal GD and a differential type time multiplexed control signal CD, to the driving integrated circuit 200 of the electro-optic device 100 corresponding to each color, synchronized with the pixel clock PCLK. In the driving integrated circuit 200, the receiver 61 receives the differential type pixel clock PCLK, the receiver 62 receives the differential type image signal GD, and the receiver 63 receives the differential type time multiplexed control signal GD.

The control circuit 30 has an image signal receiving unit 31, a reception buffer 32, a driving control unit 33, and a pattern generator 35. The horizontal scanning period H is divided into the pre-charge period TPRE and the writing period TWRT, the pattern generator 35 is a circuit performing a switching control of the selection signals SELa[1] to SELa [K] and the selection signals SELb[1] and SELb[K] in a different mode for each period.

In the pre-charge period TPRE of each horizontal scanning period H, the pattern generator 35 sets the selection signals SELa[1] to SELa[K] to the inactive level (L level) and sets the selection signals SELb[1] to SELb[K] to the active level (H level).

In the writing period TWRT of each horizontal scanning period H, the pattern generator 35 performs a switching control of the selection signals SELa[1] to SELa[K] and the selection signals SELb[1] to SELb[K] to sequentially perform the application of the gradation voltage to K signal lines 14 of the wiring blocks B[1] to B[J].

The pattern generator 35 stores, for example, K kinds of selection pattern data, to enable the switching control of the selection signals to be performed in the writing period TWRT. FIG. 7 shows an example of the content of K kinds of selection pattern data. The K kinds of selection pattern data correspond to pattern numbers PN from 0 to K−1.

Each selection pattern data is data designating the sequence of applying the gradation voltage to K signal lines constituting the wiring blocks B[1] to B[K] in the writing period TWRT. For example, the selection pattern data corresponding to the pattern number PN="0" provides instructions to apply the gradation voltage to the first signal line 14 of the wiring blocks in the first gradation voltage application period U[1] in the writing period TWRT, to apply the gradation voltage to the second signal line 14 in the second gradation voltage application period U[2], . . . , and to apply the gradation voltage to the K-th signal line in the last gradation voltage application period U[K]. The selection pattern data corresponding to the pattern number PN="1" provides instructions to apply the gradation voltage to the K-th signal line 14 of the wiring blocks in the first gradation voltage application period U[1] in the writing period TWRT, to apply the gradation voltage to the first signal line 14 in the second gradation voltage application period U[2], . . . , and to apply the gradation voltage to the (K−1)-th signal line 14 in the last gradation voltage application period U[K].

The pattern generator 35 changes the selection signals SELa[1] to SELa[K] and the selection signals SELb[1] to SELb[K] according to the selection pattern data corresponding to the pattern number PN given from the driving control unit 33 in the writing period TWRT of each horizontal scanning period H.

The driving control unit 33 periodically updates the pattern number PN given to the pattern generator 35, for example, synchronized with an internal horizontal synchronization signal HS and an internal vertical synchronization signal VS.

In FIG. 6, the image signal receiving unit 31 samples the image signal GD received by the receiver 62 by a rising edge and a falling edge of the pixel clock PCLK received by the receiver 61 under the control of the driving control unit 33, and outputs the image signal as the image signal VID to the image signal storing unit 51 (see FIG. 5). The reception buffer 32 is a buffer sampling the time multiplexed control signal CD received by the receiver 63 by the rising edge of the pixel clock PCLK received by the receiver 61, and storing bit strings of the sampled time multiplexed control signal CD equal to the previously predetermined bit number.

The driving control unit 33 has a synchronization signal detecting unit 301, a command detecting unit 302, and a driving condition register unit 303. The driving condition register unit 303 is an integrated body of a plurality of driving condition registers storing data representing various driving conditions relating to the electro-optic device 100. The driving control unit 33 performs a driving control of the electro-optic device 100 and the signal line driving circuit 24 according to the driving condition indicated by the stored content of each driving condition register in the driving condition register unit 303.

The synchronization detecting unit 301 and the command detecting unit 302 is a circuit monitoring the bit strings of the time multiplexed control signals stored in the reception buffer 32, and operating on the basis of the monitoring result. The time multiplexed control signal supplied to the driving integrated circuit 200 by the host CPU 400 is a signal obtained by time-multiplexing the bit strings representing a vertical synchronization signal VSYNC and a horizontal synchronization signal HSYNC for the driving control of the electro-optic device 100, and the bit strings representing a command for the other driving control. The bit strings representing the vertical synchronization signal VSYNC, the bit strings representing the horizontal synchronization signal HSYNC, and bit strings representing various commands are not in an identical relationship.

When the synchronization signal detecting unit 301 detects that the bit strings representing the vertical synchronization signal VSYNC are stored in the reception buffer 32, the synchronization signal detecting unit 301 outputs the internal vertical synchronization signal VS. When the synchronization signal detecting unit 301 detects that the bit strings representing the horizontal synchronization signal HSYNC are stored in the reception buffer 32, the synchronization signal detecting unit 301 outputs the internal horizontal synchronization signal HS.

The driving control unit 33 controls the image signal receiving unit 31 to start incorporation of the image signal GD synchronizing at the rising edge and the falling edge of the pixel clock PCLK whenever the synchronization signal detecting unit 301 outputs the internal horizontal synchronization signal HS, and to perform transmission to the image signal storing unit 51 of the image signal VID of each pixel of one line (N pixels). In the image signal storing unit 51, the image signals VID of N pixels are divided into J blocks formed of image signals of K pixels, and are stored in the register blocks 52[1] to 52[J] described above.

The command detecting unit 302 monitors whether or not the bit strings representing any command are stored in the reception buffer 32. One command is formed of information representing the kind of the driving condition, specifically, an address designating several driving condition registers in the driving condition register unit 303, and information representing the content of the driving condition, specifically, data to be stored in the driving condition register designated by the address. When the command detecting unit 302 detects that the bit strings representing the address of the several driving condition registers of the driving condition register unit 303 and the bit strings of the data subsequent thereto are stored in the reception buffer 32, the detected data is read from the reception buffer 32 and is written into the driving condition register in the driving condition register unit 303 designated by the detected address.

The command supplied as a part of the time multiplexed control signal from the host CPU 400 includes a horizontal synchronization performance command performed while synchronized with the first internal horizontal synchronization signal HS generated after it is stored in the driving condition register unit 303, and a vertical synchronization performance command performed while synchronized with the first internal vertical synchronization signal VS generated after storing in the driving condition register unit 303, in addition to the immediate execution command performed after it is detected by the command detecting unit 302 and is stored in the driving condition register unit 303.

As an example of the horizontal synchronization performance command, there is a command instructing generation of the enable signals EN1 and EN2 described above. The command includes data representing kinds of the generated enable signals. When the command is detected and the data of the command is stored in the driving condition register unit 303, the driving control unit 33 generates one or both of the enable signals EN1 and EN2 according to the data of the command stored in the driving condition register unit 303 in the horizontal scanning period started from the internal horizontal synchronization signal HS immediately thereafter.

As an example of the vertical synchronization performance command, there is a command instructing a display mode of the electro-optic device 100 such as gradation inversion display, vertical inversion display, and horizontal inversion display. The command includes data designating the display mode. When the command is detected by the command detecting unit 302 and the data of the command is stored in the driving condition register unit 303, the driving control unit 33 performs the display control of the electro-optic device 100 according to the data of the command stored in the driving condition register unit 303 in each vertical scanning period started from the internal vertical synchronization signal VS immediately thereafter.

For example, when the data instructing the gradation inversion display is set in the driving condition register unit 303, the driving control unit 33 sets the gradation inversion instruction signal INV1 supplied to the driving voltage generating circuits 56[1] to 56[J] to the active level in each vertical scanning period started from the internal vertical synchronization signal VS immediately thereafter. Accordingly, the driving voltage generating circuit 56[1] to 56[J] outputs the gradation voltage corresponding to the gradation obtained by inverting the gradation designated by the image signal in the writing period TWRT. Therefore, the gradation inversion display is realized.

When the data instructing the vertical inversion display is set in the driving condition register unit 303, the driving control unit 33 sets the up and down inversion instruction signal INV2 given to the scanning line driving circuit 22 of the electro-optic device 100 to the active level in each vertical scanning period started from the internal vertical synchronization signal VS immediately thereafter. Accordingly, the scanning line driving circuit 22 selects M scanning lines 12 in reverse order. Therefore, vertical inversion display is realized.

When the data instructing the horizontal inversion display is set in the driving condition register unit 303, the driving control unit 33 sets the left and right inversion instruction signal INV3 given to the image signal storing unit 51 to the active level in each vertical scanning period started from the internal vertical synchronization signal VS immediately thereafter. Accordingly, the image signal storing unit 51 writes the image signal VID of the first pixel of the horizontal scanning period into the register corresponding to the last pixel in the pixel rows on the scanning line, writes the image signal of the second pixel of the horizontal scanning period into the register corresponding to the second pixel from the last in the pixel row on the scanning line, . . . , and in this state, writes the image signal VID of each pixel written into each corresponding register in the image signal storing unit 51 in a state where the row in the horizontal direction is inverted. Accordingly, horizontal inversion display is realized.

Another example of the vertical synchronization performance command, there is a polarity instruction command instructing polarity of the gradation voltage. The polarity instruction command includes data instructing the polarity of the gradation voltage. When the polarity instruction command is detected and the data thereof is stored in the driving condition register unit 303, the driving control unit 33 supplies a polarity signal POL corresponding to the data of the polarity instruction command stored in the driving condition register unit 303 to the electro-optic device 100 in the vertical scanning period started from the internal synchronization signal VS immediately thereafter.

As another example of the vertical synchronization performance command, there is a synchronization command of a periodical update control of the driving condition, specifically, a synchronization command instructing synchronization of the periodical update control of the application sequence of the gradation voltage. The synchronization command includes an initial value of the pattern number PN as data. When the synchronization command is detected and the data thereof is stored in the driving condition register unit 303, the driving control unit 33 initializes the pattern number PN supplied to the pattern generator 35 into the data of the synchronization command stored in the driving condition register unit 303 in the vertical scanning period started from the internal vertical synchronization signal VS immediately thereafter. Then, the driving control unit 33 periodically updates the pattern number PN from the initial value, synchronized with the internal horizontal synchronization signal HS or the internal vertical synchronization signal VS.

The above description is the configuration of the control circuit 30.

Figure 8:
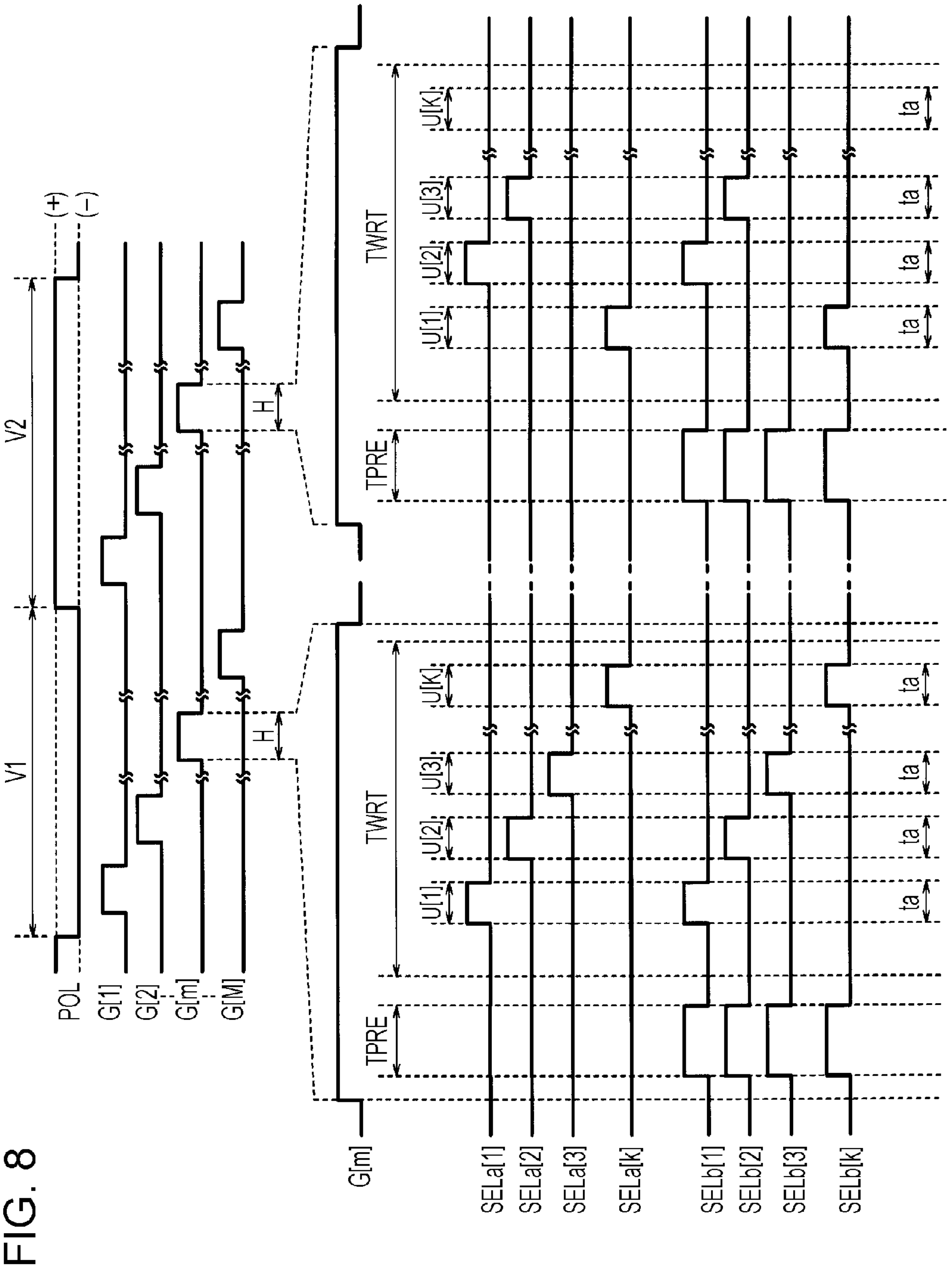
FIG. 8 is a timing chart illustrating an operation of the electro-optic device.

FIG. 8 is a timing chart illustrating an operation example of the electro-optic device 100. FIG. 8 shows an example of a waveform of each unit in any vertical scanning period V1 and a waveform of each unit in the next vertical scanning period V2. In the example shown in FIG. 8, the polarity signal POL supplied from the driving integrated circuit 200 instructs a negative polarity (−) in the vertical scanning period V1 and instructs a positive polarity (+) in the vertical scanning period V2. In the vertical scanning period V1 where the polarity signal POL instructs the negative polarity (−), the positive voltage is applied to the common electrode 423 described above. In the vertical scanning period V2 where the polarity signal POL instructs the positive polarity (+), the negative voltage is applied to the common electrode 423 described above.

When the up and down inversion instruction signal INV2 is at the inactive level, the scanning line driving circuit 22 sequentially selects M scanning lines 12 in the normal order in each vertical scanning period, synchronized with the generation of the internal horizontal synchronization signal HS by the driving control unit 33 of the control circuit 30, and sets the scanning signal G[j] corresponding to the selected scanning line 12 to the H level that is the active level in one horizontal scanning period H. Meanwhile, when the up and down inversion instruction signal INV2 is at the active level, the scanning line driving circuit 22 sequentially selects M scanning lines 12 in order reverse to the normal order in each vertical scanning period.

In the pre-charge period TPRE of each horizontal scanning period H, the pattern generator 35 of the control circuit 30 turns off all the switches 54[1] to 54[K] of the multiplexers 53[1] to 53[J] in which all the selection signals SELa[1] to SELa[K] are at the L level, and turns on all the switches 58[1] to 58[K] of the demultiplexers 57[1] to 57[J] in which all the selection signals SELb[1] to SELb[K] are at the H level. In the pre-charge period TPRE of each horizontal scanning period H, the driving voltage generating circuits 56[1] to 56[J] output the pre-charge voltage of the polarity indicated by the polarity signal POL. The pre-charge voltage output by one driving voltage generating circuit 56[j] is applied to K signal lines 14 of the wiring block B[j] through K switches 58[1] to 58[J] of the demultiplexer 57[j]. Accordingly, in the pre-charge period TPRE, the pre-charge voltage is applied to all the signal lines 14 of the pixel unit 10.

In the writing period TWRT of each horizontal scanning period H, the pattern generator 35 switches the selection signals SELa[1] to SELa[K] and the selection signals SELb [1] to SELb[K] according to the selection pattern data corresponding to the pattern number PN at the time point.

On the lower left side of FIG. 8, an example of waveforms of the selection signals SELa [1] to SELa[K] and the selection signals SELb[1] to SELb[K] generated in the horizontal scanning period H in the vertical scanning period V1 (for example, the m-th horizontal scanning period H in the vertical scanning period V1) is shown. In the example, in the gradation voltage application period U[1], only a set of the selection signals SELa[1] and SELb[1] is considered as the H level, and the switch 54[1] in the multiplexers 53[1] to 53[J] and the switch 58[1] in the demultiplexers 57[1] to 57[J] are turned on. As a result, the image signal VID of the first pixel in each of the register block 52[1] to 52[J] passes through each switch 54[1] of the multiplexers 53[1] to 53[J], and is supplied as the image signals D[1] to D[J] to the driving voltage generating circuits 56[1] to 56[J]. At this time point, the polarity signal POL instructs the negative polarity (−). For example, when the gradation inversion instruction signal INV1 is at the inactive level, the driving voltage generating circuits 56[1] to 56[J] output the gradation voltage VG corresponding to the designation gradation of the image signals D[1] to D[J] supplied thereto in the range of the negative polarity in reference potential VREF. The gradation voltage VG output by the driving voltage generating circuits 56[1] to 56[J] passes through the switch 58[1] in the demultiplexers 57[1] to 57[J], and is applied as the signal line driving signals C[1] to C[J] to the first signal line 14 of each of the wiring blocks B[1] to B[J].

In the gradation voltage application period U[2], only a set of the selection signals SELa[2] and SELb[2] is considered as the H level, and the switch 54[2] in the multiplexers 53[1] to 53[J] and the switch 58[2] in the demultiplexers 57[1] to 57[J] are turned on. As a result, each gradation voltage VG corresponding to the image signal VID of the second pixel in each of the register blocks 52[1] to 52[J] is generated, passes through the switch 58[2] in the demultiplexers 57[1] to 57[J], and is applied as the signal line driving signal C[1] to C[J] to the second signal line 14 of each of the wiring blocks B[1] to B[J].

Hereinafter, similarly, the gradation voltage VG corresponding to the image signal of the third pixel in each register block is applied to the third signal line 14 of each wiring block in the gradation voltage application period U[3], the gradation voltage VG corresponding to the image signal of the fourth pixel in each register block is applied to the fourth signal line 14 of each wiring block in the gradation voltage application period U[4], . . . , and the gradation voltage VG corresponding to the image signal of the K-th pixel in each register block is applied to the K-th signal line 14 of each wiring block in the last gradation voltage application period U[K].

The above description is the operation of the units in the m-th horizontal scanning period H of the vertical scanning period V1.

On the lower right side of FIG. 8, waveforms of the selection signals SELa [1] to SELa[K] and the selection signals SELb[1] to SELb[K] generated in the same horizontal scanning period H in the next vertical scanning period V2 of the vertical scanning period V1 (that is, the m-th horizontal scanning period H in the vertical scanning period V2) are shown.

In the example, the pattern number PN given to the pattern generator 35 in the m-th horizontal scanning period H of the vertical scanning period V2 is different from the pattern number PN given to the pattern generator 35 in the m-th horizontal scanning period H of the vertical scanning period V1. For this reason, in the writing period TWRT of the m-th horizontal scanning period H of the vertical scanning period V2, the gradation voltage is applied to K signal lines 14 of each wiring block in an order different from the writing period TWRT of the m-th horizontal scanning period H of the vertical scanning period V1.

In the example shown on the lower right side of FIG. 8, the gradation voltage VG corresponding to the image signal of the K-th pixel in each register block is applied to the K-th signal line 14 of each wiring block in the gradation voltage application period U[1] of the writing period TWRT, the gradation voltage VG corresponding to the image signal of the first pixel in each register block is applied to the first signal line 14 of each wiring block in the gradation voltage application period U[2], . . . , and the gradation voltage VG corresponding to the image signal of the (K−1)-th pixel in each register block is applied to the (K−1)-th signal line 14 of each wiring block in the last gradation voltage application period U[K].

In the vertical scanning period V2, the polarity signal POL instructs the positive polarity (+), and thus the driving voltage generating circuits 56[1] to 56[J] output the gradation voltage VG corresponding to the designation gradation of the image signal supplied thereto in the range of the positive polarity in the reference potential VREF.

Figure 9:
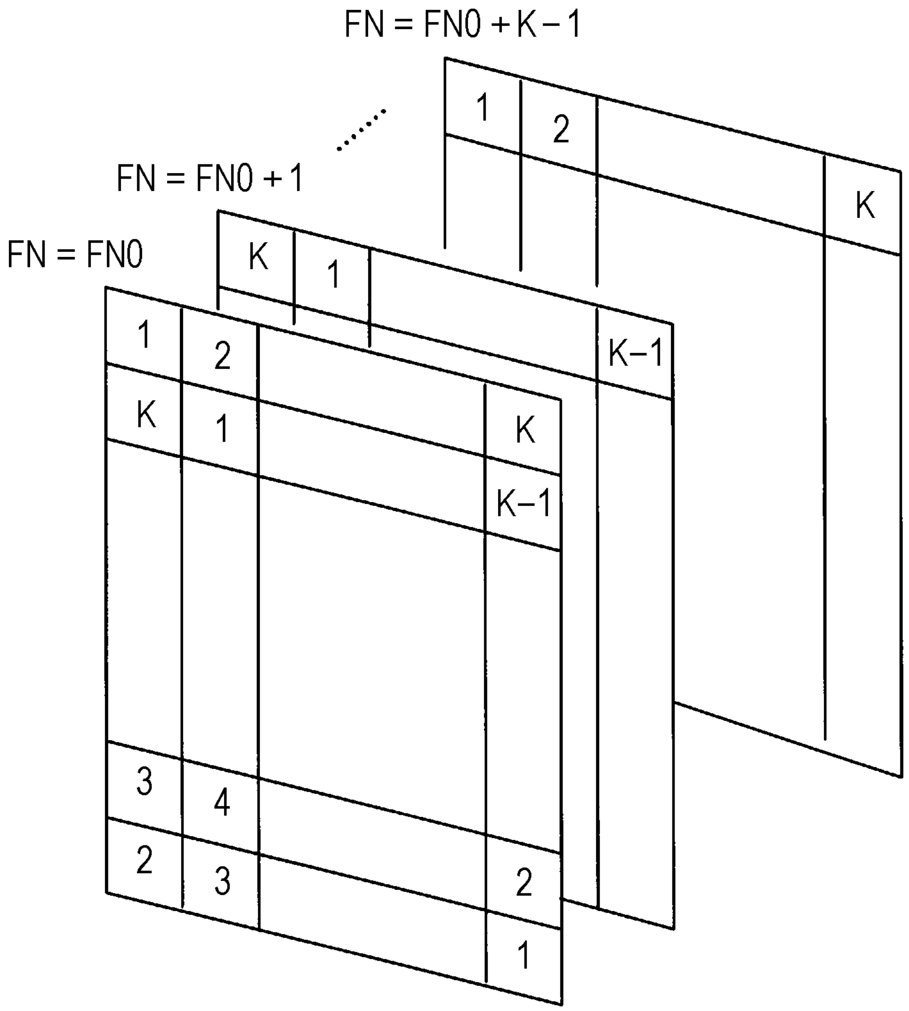
FIG. 9 is a diagram illustrating an example of an update control of a sequence of applying gradation voltage to a plurality of signal lines in a wiring block in the embodiment.

As described above, the gradation voltage is applied to K signal lines 14 of each wiring block in order different from that of the m-th horizontal scanning period H of the vertical scanning period V1 and the m-th horizontal scanning period H of the vertical scanning period V2. As described above, in the embodiment, the sequence of applying the gradation voltage to K signal lines 14 of each wiring block is changed according to the complete change of the vertical scanning period, but is changed according to the complete change of the horizontal scanning period H. FIG. 9 shows an example of the change of the sequence of applying the gradation voltage to K signal lines 14 in each wiring block. In FIG. 9, the longitudinal direction corresponds to a transition direction of the horizontal scanning period H, and the transverse direction corresponds to alignment of K gradation voltage application periods U[1] to U[K]. In the example shown in FIG. 9, the sequence of applying the gradation voltage to the signal lines 14 in the wiring block in the same vertical scanning period is rotationally shifted to the rear side once whenever the horizontal scanning period H is completely changed. In the example shown in FIG. 9, paying attention to the same horizontal scanning period H in each vertical scanning period, the sequence of applying the gradation voltage to the signal lines 14 in the wiring block is rotationally shifted to the rear side once whenever the vertical scanning period is completely changed.

Accordingly, as viewed through the plurality of horizontal scanning periods and the plurality of vertical scanning periods among the signal lines 14, the time average value of the sequence of applying the gradation voltage in one horizontal scanning period becomes uniform. Accordingly, when the electro-optic device is considered as a single body, display blur is reduced.

Figure 10A:
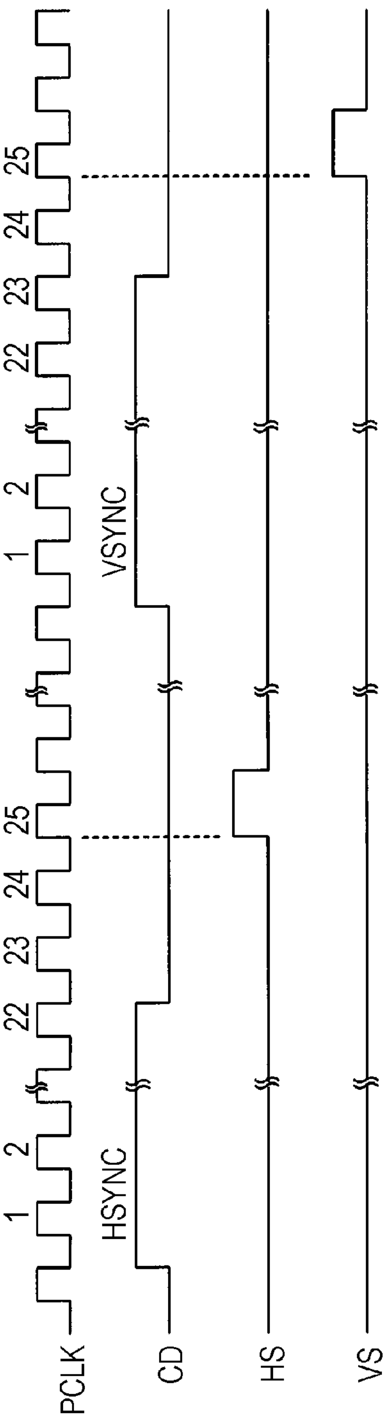
FIG. 10A and FIG. 10B are timing charts illustrating waveforms of various signals transmitted from a host CPU to the driving integrated circuit in the embodiment.
Figure 10B:
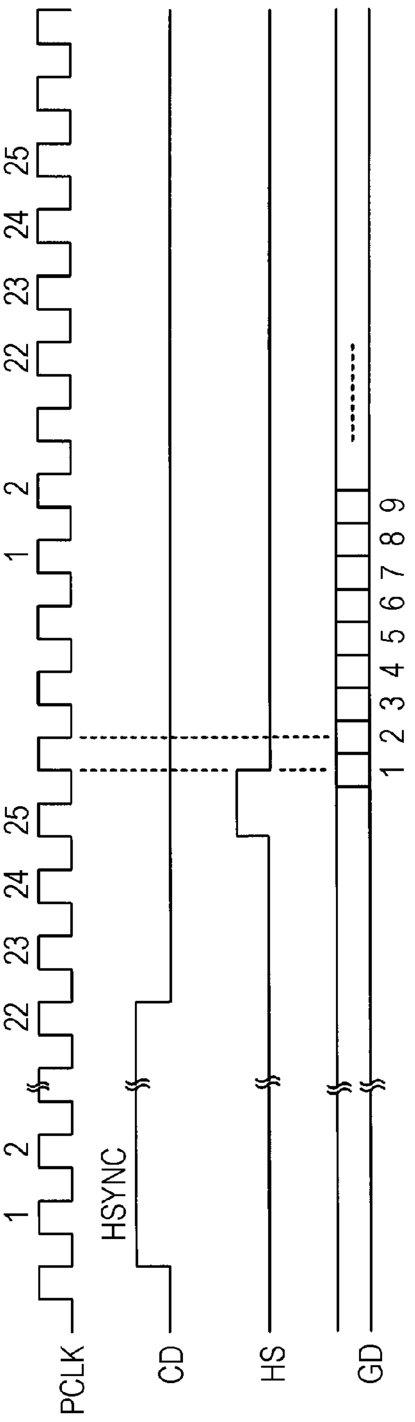
Figure 11:
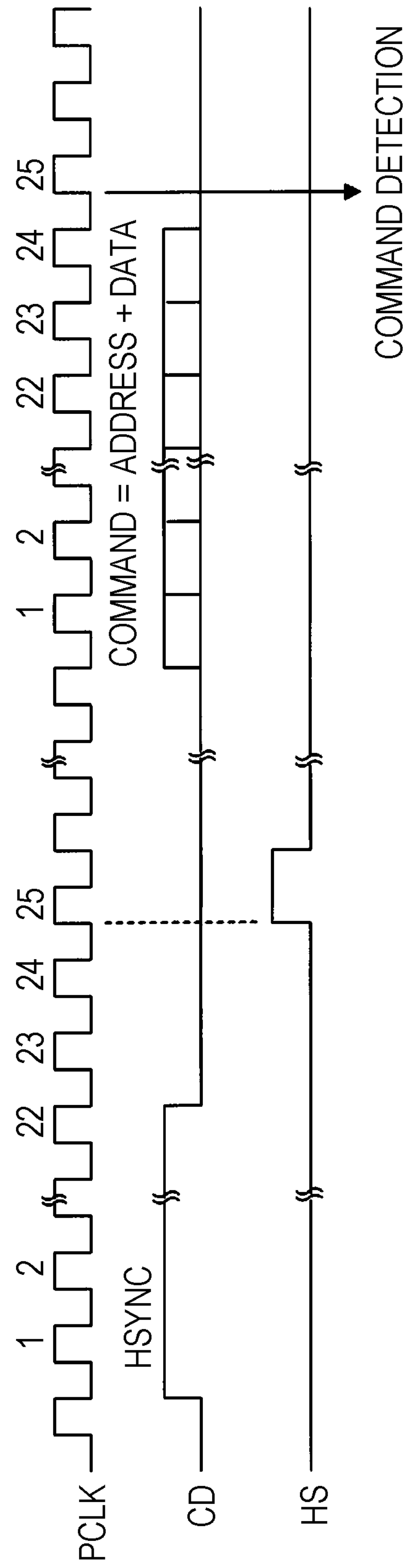
FIG. 11 is a timing chart illustrating that a horizontal synchronization signal and a command are transmitted from the host CPU to the driving integrated circuit in the embodiment.

FIG. 10A and FIG. 10B are timing charts illustrating waveforms transmitted from the host CPU 400 to the driving integrated circuit 200 in the embodiment. FIG. 11 is a timing chart illustrating that the horizontal synchronization signal HSYNC and the command are transmitted from the host CPU 400 to the driving integrated circuit 200 in the embodiment. Hereinafter, the operation of the embodiment will be described with reference to the drawings.

In the embodiment, each of various control signals supplied as a part of the time multiplexed control signal CD from the host CPU 400 to the driving integrated circuit 200 has a bit length of 24 bits. When there is a control signal to be supplied to the driving integrated circuit 200, the host CPU 400 synchronizes the 24-bit digital signal constituting the control signal with the pixel clock PCLK and transmits the signal to the driving integrated circuit 200.

As shown in FIG. 10A, the horizontal synchronization signal HSYNC is a digital signal formed of 22 bits of continuous "1"s and 2 bits of "0"s subsequent thereto. The vertical synchronization signal VSYNC is a digital signal formed of 23 bits of continuous "1"s and 1 bit of "0" subsequent thereto.

When the 24-bit digital signal that is the horizontal synchronization signal HSYNC is transmitted as a part of the time multiplexed control signal CD from the host CPU 400 to the driving integrated circuit 200, the horizontal synchronization signal HSYNC is stored in the reception buffer 32 of the driving integrated circuit 200. The synchronization signal detecting unit 301 detects the 24-bit horizontal synchronization signal HSYNC in the reception buffer 32, and outputs the internal horizontal synchronization signal HS having a pulse width of one cycle of the pixel clock PCLK, synchronized with the rising edge of the pixel clock PCLK thereafter, that is, the rising edge of the twenty-fifth pixel clock PCLK counted from the pixel clock PCLK synchronized with the leading bit of the horizontal synchronization signal HSYNC.

Similarly, when the 24-bit digital signal that is the vertical synchronization signal VSYNC is transmitted from the host CPU 400 to the driving integrated circuit 200, the vertical synchronization signal VSYNC is stored in the reception buffer 32 of the driving integrated circuit 200. The synchronization signal detecting unit 301 detects the 24-bit vertical synchronization signal HSYNC in the reception buffer 32, and outputs the internal vertical synchronization signal VS having a pulse width of one cycle of the pixel clock PCLK, synchronized with the rising edge of the pixel clock PCLK thereafter.

FIG. 10B shows the transmission of the image signal GD performed after the horizontal synchronization signal HSYNC is transmitted. The host CPU 400 transmits the 24-bit horizontal synchronization signal HSYNC synchronized with 24 pixel clocks PCLK, and then starts transmitting the image signal GD of one horizontal scanning period from the rising edge of the twenty-sixth pixel clock PCLK counted from the transmission start timing of the horizontal synchronization signal HSYNC. Further, the host CPU 400 transmits the image signal GD of the first pixel using the period over the rising edge of the twenty-sixth pixel clock PCLK, transmits the image signal GD of the second pixel using the period over the falling edge of the twenty-sixth pixel clock PCLK, transmits the image signal GD of the third pixel using the period over the rising edge of the twenty-seventh pixel clock PCLK, . . . , and in this state, the image signal GD of the pixels to be driven in one horizontal scanning period is transmitted while synchronized with both the rising edge and the falling edge of the pixel clock PCLK.

In the driving integrated circuit 200, the image signal receiving unit 31 starts incorporation of the image signal GD from the rising edge of the first pixel clock PCLK after the driving control unit 33 generates the internal horizontal synchronization signal HS. The image signal receiving unit 31 supplies the obtained image signal GD as the image signal VID to the image signal storing unit 51. When the left and right inversion instruction signal INV3 is at the inactive level, the image signal storing unit 51 stores the image signal VID of the pixels of one line supplied from the image signal receiving unit 31 in the register blocks 52[1] to 52[J] along the normal alignment sequence. Meanwhile, when the left and right inversion instruction signal INV3 is at the active level, the image signal storing unit 51 stores the image signal VID of the pixels of one line supplied from the image signal receiving unit 31 in the register blocks 52[1] to 52[J] along the alignment sequence reverse to the normal alignment sequence. In the driving integrated circuit 200, the driving control of the electro-optic device 100 is performed using the image signals stored in the register blocks 52[1] to 52[J] of the image signal storing unit 51 in such a manner.

As shown in FIG. 11, the time multiplexed control signal CD transmitted from the host CPU 400 to the driving integrated circuit 200 includes a 24-bit digital signal representing various commands. When the 24-bit digital signal is transmitted from the host CPU 400 to the driving integrated circuit 200, the digital signal representing the command is stored in the reception buffer 32 of the driving integrated circuit 200. When the command detecting unit 302 detects the 24-bit command in the reception buffer 32, the command detecting unit 302 stores the data of the command in the driving condition register of the driving condition register unit 303 indicated by the address of the command, synchronized with the rising edge of the pixel clock PCLK thereafter, that is, the rising edge of the twenty-fifth pixel clock PCLK counted from the pixel clock PCLK synchronized with the leading bit of the command. Accordingly, in the driving integrated circuit 200, the driving control is performed according to the command extracted from the time multiplexed control signal.

As described above, according to the embodiment, since the control signal for the driving integrated circuit 200 is the differential type signal, it is possible to reduce production defects and to improve the transmission speed in the driving integrated circuit 200. Since the signal obtained by multiplexing the plurality of control signals is supplied to the driving integrated circuit 200, it is possible to reduce the number of signal lines for transmitting the signal to the driving integrated circuit 200 and to reduce the number of terminals of the driving integrated circuit.

According to the embodiment, the driving integrated circuit 200 can extract the vertical synchronization signal VSYNC and the horizontal synchronization signal HSYNC from the time multiplexed control signal CD. Therefore, according to the embodiment, the host CPU 400 supplying the time multiplexed control signal CD can synchronize the driving control of the electro-optic device 100 performed by the driving integrated circuit 200 with the horizontal synchronization signal HSYNC and the vertical synchronization signal VSYNC. In the embodiment, the horizontal synchronization signal HSYNC and the vertical synchronization signal VSYNC are transmitted as the differential type signals to the driving integrated circuit 200. In the driving integrated circuit 200, the receiver 63 that is the differential amplifier receives the horizontal synchronization signal HSYNC and the vertical synchronization signal VSYNC. Accordingly, it is possible to receive the horizontal synchronization signal HSYNC or the vertical synchronization signal VSYNC in a state where noise is canceled in the driving integrated circuit 200 even when the noise is overlapped with the horizontal synchronization signal HSYNC or the vertical synchronization signal VSYNC in the transmission course.

According to the embodiment, the driving integrated circuit 200 extracts various commands designating the driving mode of the electro-optic device 100 from the time multiplexed control signal CD, and performs the driving control of the electro-optic device 100 in the driving mode indicated by the extracted command. Therefore, according to the embodiment, it is possible to control the driving integrated circuit 200 to perform various kinds of driving control of the electro-optic device 100.

In the embodiment, the control circuit 30 of the driving integrated circuit 200 has the driving control unit 33 performing the periodical update control of the driving condition of the electro-optic device 100. The command detecting unit 302 of the driving control unit 33 has the function of extracting the synchronization command designating the content of the driving condition that is the target of the periodical update control, as the command designating the driving mode of the electro-optic device 100. The driving control unit 33 has the unit setting the content of the driving condition that is the target of the periodical update control to the content indicated by the extracted synchronization command when the synchronization command is extracted. Therefore, according to the embodiment, the host CPU 400 can set the content of the driving condition that is the target of the periodical update control performed by each driving integrated circuit 200 to a desired content, by supplying the synchronization command to the plurality of driving integrated circuits 200 performing the driving control of the plurality of electro-optic devices 100. Specifically, the periodical update control of the sequence of applying the gradation voltage performed on each driving integrated circuit 200 can synchronize (simultaneously initialize the pattern numbers PN to the same pattern value). Accordingly, discordance in the pattern numbers PN is prevented from occurring among the driving integrated circuits 200, and thus it is possible to prevent color attachment from occurring on the display image.

Hereinafter, the effect of the color attachment prevention will be described in detail.

First, a cause of occurrence of the color attachment will be described. When the update control of the sequence of applying the gradation voltage to the signal lines in the wiring block is performed, for example, synchronized with the vertical scanning period, the transmissivity of liquid crystal of the pixel circuits is uniform among the signal lines. For this reason, the display blur appearing on the display image of the electro-optic device is reduced. The same is applied even when the update of the sequence of applying the gradation voltage to the signal lines is performed while synchronized with the horizontal scanning period. As described above, when paying attention to one electro-optic device, the technique of performing the update of the sequence of applying the gradation voltage to the signal lines has an effect of reducing the display blur.

However, for example, in the same manner as the projection type display device, in an electronic apparatus performing the image display using the plurality of electro-optic devices (liquid crystal light valves), the update control of the driving condition of the driving circuit, specifically, the update controls of the sequence of applying the gradation voltage to the signal lines in the wiring block are performed independently from each other in the electro-optic devices. Accordingly, a phase difference occurs in the update control of applying the gradation voltage among the liquid crystal light valves, the signal lines in the wiring block are selected in order of, for example, the first signal line, the second signal line, the third signal line, and the fourth signal line in the liquid crystal light valve corresponding to R color in any horizontal scanning period, the gradation voltage is applied. On the contrary, in the liquid crystal light valve corresponding to G color in the same horizontal scanning period, there may be a case where the signal lines in the wiring block are selected in order of the third signal line, the fourth signal line, the first signal line, and the second signal line, and the gradation voltage is applied.

In this case, in the liquid crystal light valve corresponding to the R color and the liquid crystal light valve corresponding to the G color, the positional relationships between the timing of applying the gradation voltage to the first signal line and the timing of applying the gradation voltage to the third signal line in one horizontal scanning period are reverse to each other. For this reason, for example, there may be a case where the R color is more easily emphasized than the G color at the part corresponding to the first signal line in the projection image, and the G color is more easily emphasized than the R color at the part corresponding to the third signal line. As described above, when the sequence of applying the gradation voltage to the signal lines is different among the liquid crystal light valves corresponding to the colors of R, G, and B, the color balance of the projection image corresponding to the signal lines is different among the signal lines, and thus the color attachment occurs on the projection image.

In the embodiment, as described above, the host CPU 400 simultaneously transmits the synchronization command to the plurality of driving integrated circuits 200 performing the driving control of the plurality of electro-optic devices 100 corresponding to the colors, to initialize the pattern number PN determining the sequence of applying the gradation voltage. Accordingly, the host CPU 400 repeats the transmission of the synchronization command to the driving integrated circuits 200 at a cycle of integer times the cycle of the update control of the sequence of applying the gradation voltage, the discordance of the sequence of applying the gradation voltage is prevented from occurring among the driving integrated circuits 200, and thus it is possible to prevent the color attachment from occurring.

Second Embodiment

In the embodiment, the control circuit 30 of the driving integrated circuit 200 extracts the control signal obtained by concatenating the additional signal designating the driving mode of the electro optic-device 100 and the horizontal synchronization signal HSYNC from the time multiplexed control signal CD, generates the internal horizontal synchronization signal HS, and starts the driving of the electro-optic device 100 in the driving mode indicated by the additional signal included in the control signal in the next horizontal scanning period of the horizontal scanning period started from the internal horizontal scanning period, from the first embodiment.

Figure 12A:
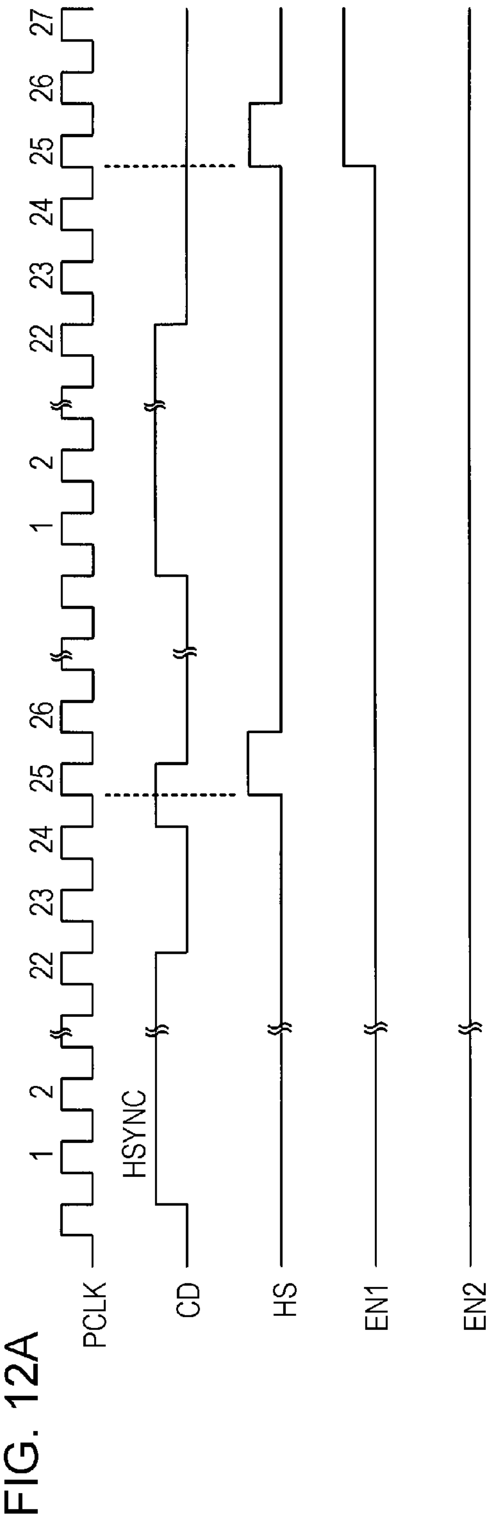
FIG. 12A and FIG. 12B are timing charts illustrating that an additional signal is transmitted with the horizontal synchronization signal from the host CPU to the driving integrated circuit in a second embodiment of the invention.
Figure 12B:
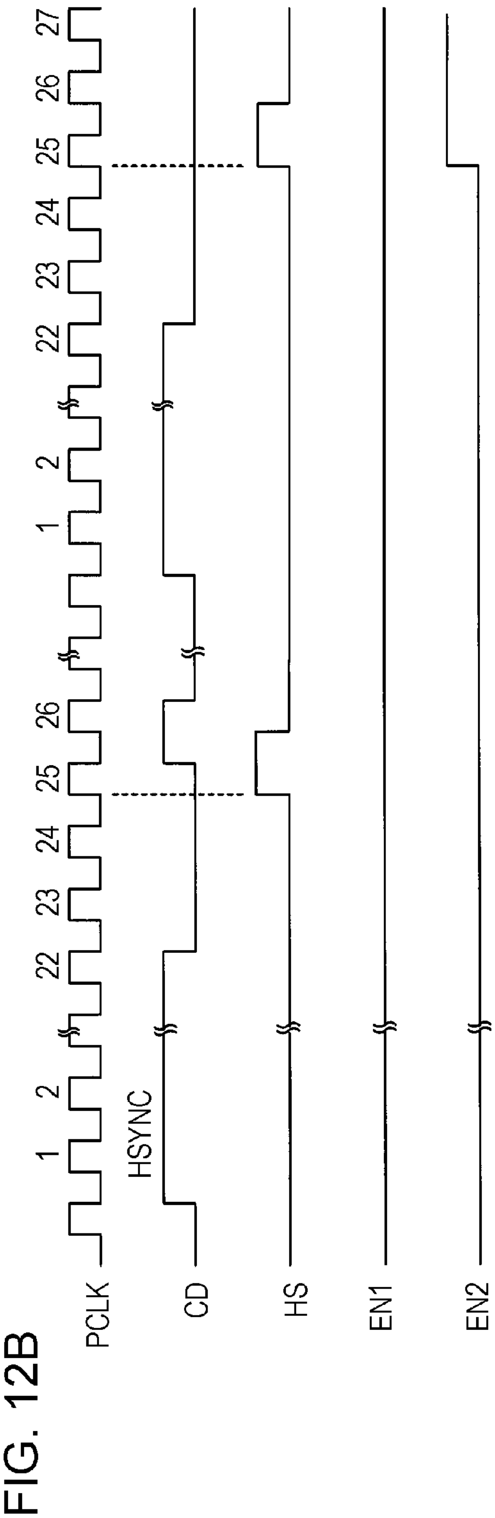

FIG. 12A and FIG. 12B show that a 2-bit additional signal by concatenating the horizontal synchronization signal HSYNC is transmitted with the horizontal synchronization signal HSYNC from the host CPU 400 to the driving integrated circuit 200 in the embodiment. In the embodiment, the 2-bit additional signal takes a role of the horizontal synchronization performance command in the first embodiment. Specifically, the 2-bit additional signal is a signal designating the scanning line 12 as the driving target of the plurality of scanning lines 12 provided in the electro-optic device 100, that is, a signal instructing to generate the enable signals EN1 and EN2.

In the example shown in FIG. 12A, the twenty-fifth bit by concatenating the bit strings of 24 bits representing the horizontal synchronization signal HSYNC is "1" and the twenty-sixth bit is "0". Accordingly, when the control circuit 30 of the driving integrated circuit 200 receives the horizontal synchronization signal HSYNC and the additional signal, then receives the next horizontal synchronization signal HSYNC, and generates the internal horizontal synchronization signal HS is generated, the control circuit 30 of the driving integrated circuit 200 sets the enable signal EN1 to the active level and sets the enable signal EN2 to the inactive level.

In the example shown in FIG. 12B, the twenty-fifth bit by concatenating the bit strings of 24 bits representing the horizontal synchronization signal HSYNC is "0" and the twenty-sixth bit is "1". Accordingly, when the control circuit 30 of the driving integrated circuit 200 receives the horizontal synchronization signal HSYNC and the additional signal, then receives the next horizontal synchronization signal HSYNC, and generates the internal horizontal synchronization signal HS, the control circuit 30 of the driving integrated circuit 200 sets the enable signal EN1 to the inactive level and sets the enable signal EN2 to the active level.

Although not shown, there may be a case where both of the twenty-fifth bit and the twenty-sixth bit concatenating on from the bit strings of 24 bits representing the horizontal synchronization signal HSYNC are "1". In this case, the control circuit 30 of the driving integrated circuit 200 receives the horizontal synchronization signal HSYNC and the additional signal, and then sets both of the enable signal EN1 and the enable signal EN2 to the active level when the next horizontal synchronization signal HSYNC is received and the internal horizontal synchronization signal HS is generated.

In order to transmit the additional signal with the horizontal synchronization signal HSYNC to the driving integrated circuit 200, the following condition must be satisfied. That is, the bit strings formed of the horizontal synchronization signal HSYNC and the additional signal should not include the vertical synchronization signal VSYNC or the bit strings representing various commands. When this condition is satisfied, the control circuit 30 of the driving integrated circuit 200 can extract the horizontal synchronization signal HSYNC with the addition signal, the vertical synchronization signal VSYNC, and various commands from the time multiplexed control signal without interference from the others.

Accordingly, in the embodiment, it is possible to obtain the same effect as that of the first embodiment.

Third Embodiment

In the embodiment, in the same manner as the second embodiment, the control circuit 30 of the driving integrated circuit 200 extracts the control signal obtained by concatenating the additional signal designating the driving mode of the electro-optic device 100 and the horizontal synchronization signal HSYNC from the time multiplexed control signal CD.

When the horizontal synchronization signal HSYNC with the additional signal is extracted from the time multiplexed control signal, the control circuit 30 of the driving integrated circuit 200 in the second embodiment starts the driving control of the electro-optic device 100 in the driving mode indicated by the additional signal in the next horizontal scanning period of the horizontal scanning period generated by the extraction of the horizontal synchronization signal HSYNC.

In contrast, when the horizontal synchronization signal HSYNC with the additional signal is extracted from the time multiplexed control signal, the control circuit 30 of the driving integrated circuit 200 in the embodiment starts the driving control of the electro-optic device 100 in the driving mode indicated by the additional signal in the horizontal scanning period generated by the extraction of the horizontal synchronization signal HSYNC.

Figure 13A:
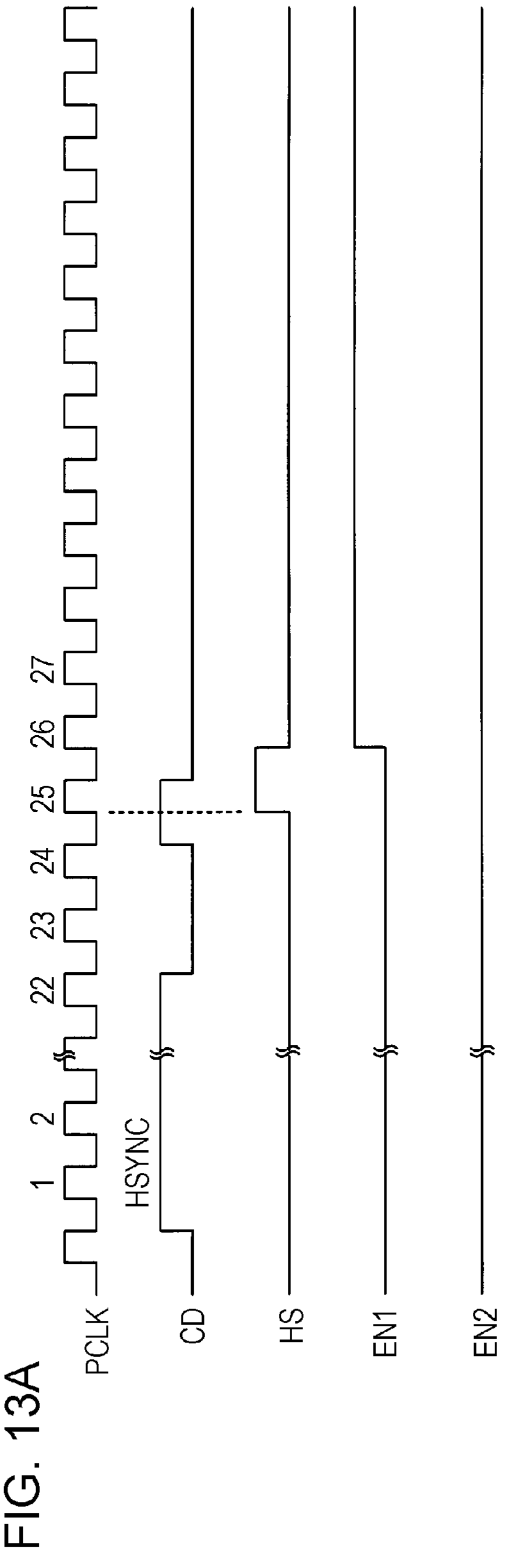
FIG. 13A and FIG. 13B are timing charts illustrating that an additional signal is transmitted with the horizontal synchronization signal from the host CPU to the driving integrated circuit in a third embodiment of the invention.
Figure 13B:
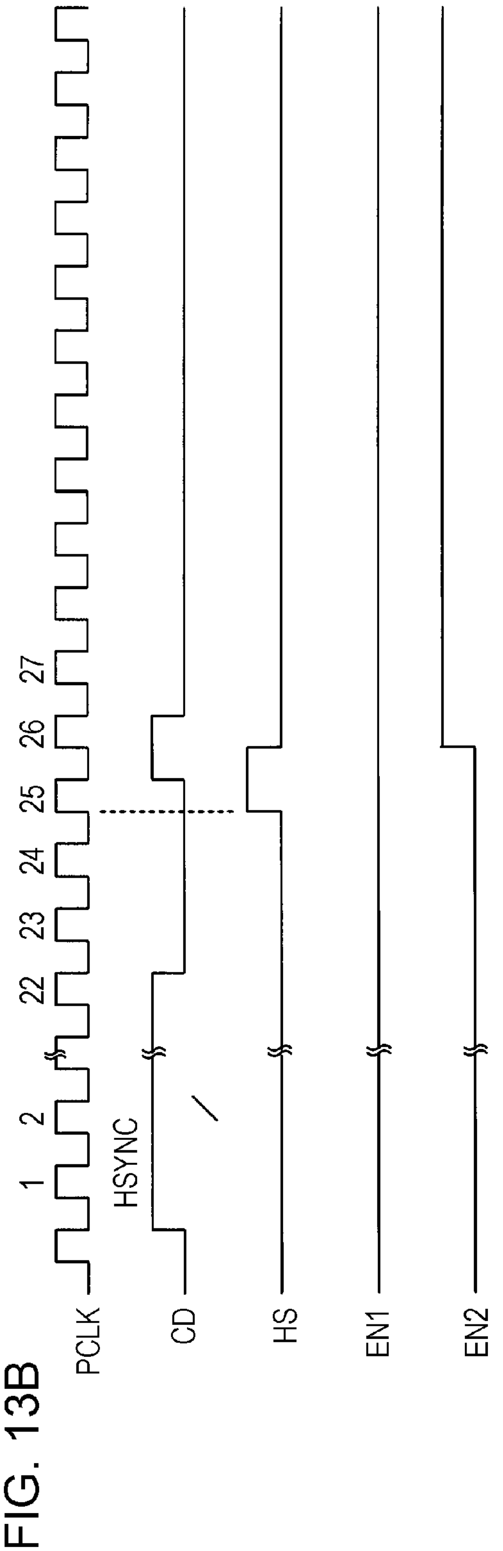

FIG. 13A and FIG. 13B show that a 2-bit additional signal by concatenating the horizontal synchronization signal HSYNC is transmitted with the horizontal synchronization signal HSYNC from the host CPU 400 to the driving integrated circuit 200 in the embodiment. In the same manner as the second embodiment, the 2-bit additional signal is a signal instructing the generation of the enable signals EN1 and EN2 in the first embodiment.

In the example shown in FIG. 13A, the twenty-fifth bit by concatenating the bit strings of 24 bits representing the horizontal synchronization signal HSYNC is "1" and the twenty-sixth bit is "0". Accordingly, when the control circuit 30 of the driving integrated circuit 200 receives the horizontal synchronization signal HSYNC and the additional signal and generates the internal horizontal synchronization signal HS is generated, the control circuit 30 of the driving integrated circuit 200 sets the enable signal EN1 to the active level and sets the enable signal EN2 to the inactive level.

In the example shown in FIG. 13B, the twenty-fifth bit by concatenating the bit strings of 24 bits representing the horizontal synchronization signal HSYNC is "0" and the twenty-sixth bit is "1". Accordingly, when the control circuit 30 of the driving integrated circuit 200 receives the horizontal synchronization signal HSYNC and the additional signal and then generates the internal horizontal synchronization signal HS, the control circuit 30 of the driving integrated circuit 200 sets the enable signal EN1 to the inactive level and sets the enable signal EN2 to the active level.

Accordingly, in the embodiment, it is possible to obtain the same effect as that of the first and second embodiments.

Modified Example

The first to third embodiments of the invention have been described above, but the invention is not limited to the embodiments described above, and may be modified as follows.

(1) In the first embodiment, the command instructing to generate the internal horizontal synchronization signal HS and the command instructing to generate the internal vertical synchronization signal VS are provided, the driving control unit 33 may control the command detecting unit 302 to extract various commands including such commands from the time multiplexed control signal. With such a configuration, there is an advantage that it is not necessary to provide the driving control unit 33 with the synchronization signal detecting unit 301.

(2) In the second and third embodiments, the control circuit 30 of the driving integrated circuit 200 may receive the control signal formed of the horizontal synchronization signal HSYNC with the additional signal, but the control circuit 30 of the driving integrated circuit 200 may receive the control signal formed of the vertical synchronization signal VSYNC with the additional signal. For example, an aspect is conceivable in which the control circuit 30 extracts the control signal obtained by concatenating the additional signal designating the driving mode of the electro-optic device 100 and the vertical synchronization signal VSYNC from the time multiplexed control signal CD, generates the internal vertical synchronization signal VS, and performs the driving of the electro-optic device 100 in the driving mode indicated by the additional signal included in the control signal in the next vertical scanning period of the vertical scanning period started from the internal vertical synchronization signal VS. Another aspect is conceivable in which the control circuit 30 extracts the control signal obtained by concatenating the additional signal designating the driving mode of the electro-optic device 100 and the vertical synchronization signal VSYNC from the time multiplexed control signal CD, generates the internal vertical synchronization signal VS, and performs the driving of the electro-optic device 100 in the driving mode indicated by the additional signal included in the control signal in the vertical scanning period started from the internal vertical synchronization signal VS. As an example of the driving control instructed by the additional signal, the control of the polarity of the gradation voltage and the synchronization control of the pattern number PN are conceivable.

(3) In the first embodiment, a switch may be provided on the path of the power supply current for the receiver 62, the switch may be turned off when the storing of the image signal of one horizontal period in the image signal receiving unit 31 is completed during one horizontal scanning period, and the control circuit 30 may be provided with a unit that stops supplying power to the receiver 62 until the next horizontal scanning period is started. According to the aspect, the supply of power to the receiver 62 in the period when the image signal is not supplied is stopped, and thus it is possible to reduce power consumption of the driving integrated circuit 200.

(4) The liquid crystal element 42 is only an example of the electro-optic element. In the electro-optic element applied to the invention, discrimination between a self-luminous type of element and a non self-luminous element (for example, the liquid crystal element 42) of changing transmissivity or reflectance of external light, or discrimination between a current driving type of driving by supply of current and a voltage driving type of driving by applying electric field (voltage) is not relevant. For example, the invention is applied to the electro-optic device 100 using various electro-optic elements such as an organic EL element, an inorganic EL element, an LED (light emitting diode), a field-emission (FE) element, a surface conduction electron emitter (SE) element, a ballistic electron emitting (BS) element, an electrophoretic element, or an electrochromic element. That is, the electro-optic element includes a driven element (typically, a display element, the gradation of which is controlled according to the gradation signal) using an electro-optic substance (for example, liquid crystal 425), the gradation (optical characteristics such as transmissivity and brightness) of which is changed according to an electrical operation such as supply of current and application of voltage (electric field).

Application

Figure 14:
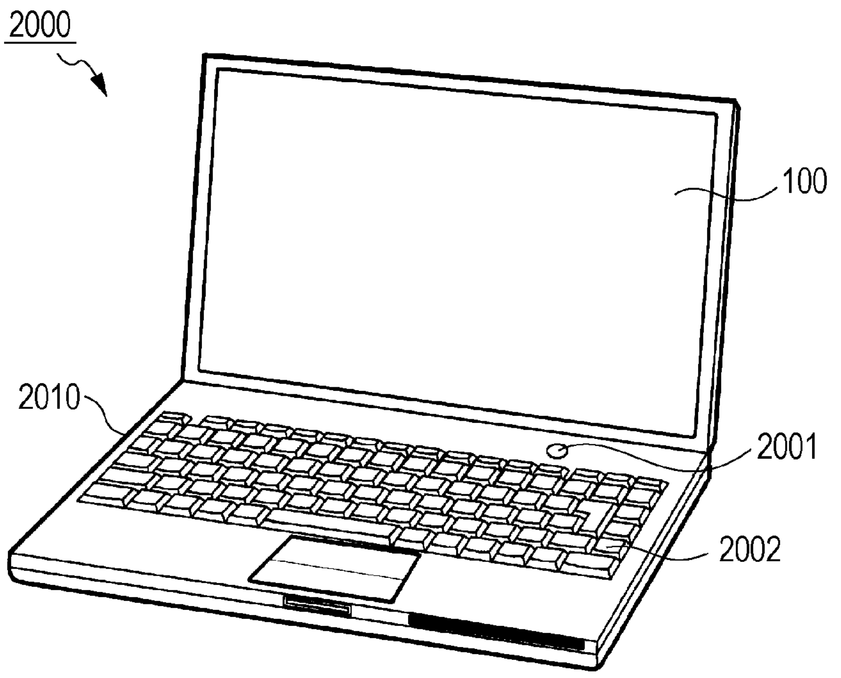
FIG. 14 is a perspective view illustrating another aspect (personal computer) of the electronic apparatus that is an application of the invention.
Figure 15:
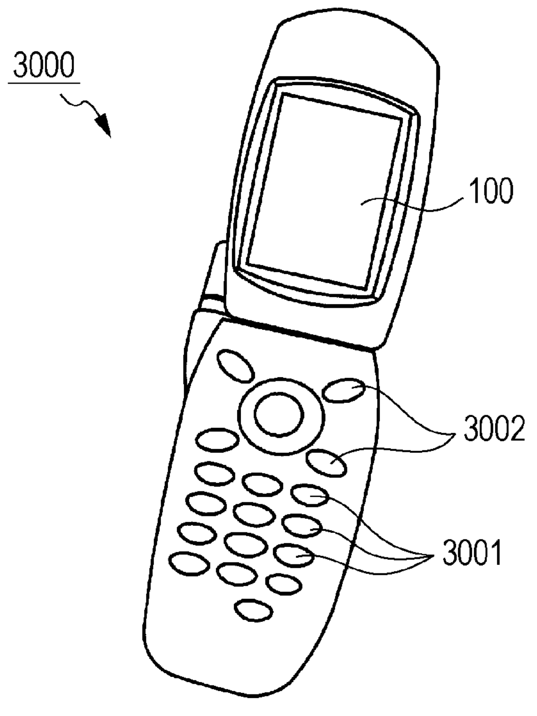
FIG. 15 is a perspective view illustrating still another aspect (mobile phone) of the electronic apparatus that is an application of the invention.

The invention may be used for various electronic apparatuses other than the projection type display device. FIG. 14 and FIG. 15 show an example of specific forms that is the application target of the invention.

FIG. 14 is a perspective view illustrating a portable personal computer employing the electro-optic device. The personal computer 2000 includes an electro-optic device 100 that displays various images, and a body unit 2010 provided with a power supply switch 2001 and a keyboard 2002.

FIG. 15 is a perspective view illustrating a mobile phone. The mobile phone 3000 includes a plurality of operation buttons 3001, scroll buttons 3002, and an electro-optic device 100. The picture displayed on the electro-optic device 100 is scrolled by operating the scroll buttons 3002. The invention can be applied to such a mobile phone.

In addition, as an electronic apparatus to which the invention is applied in addition to the apparatuses shown as examples in FIGS. 1, 14, and 15, there may be a mobile information terminal (PDA: personal digital assistants), a digital camera, a television, a video camera, a car navigation device, a vehicle display (instrument panel), an electronic scheduler, an electronic paper, a calculator, a word processor, a work station, a video phone, a POS terminal, a printer, a scanner, a copier, a video player, and an apparatus provided with a touch panel.

This application claims priority to Japan Patent Application No. 2011-052603 filed Mar. 10, 2011, the entire disclosures of which are hereby incorporated by reference in their entireties.

What is claimed is:

1. A driving integrated circuit comprising:

a first receiver that receives a differential type pixel clock;

a second receiver that receives a differential type image signal synchronized with the differential type pixel clock;

a third receiver that receives a time multiplexed control signal which is the differential type signal synchronized with the differential type pixel clock and is obtained by time-multiplexing a plurality of control signals; and a control circuit that receives the differential type image signal through the second receiver by synchronized with the differential type pixel clock received by the first receiver, generates the differential type image signal driving an electro-optic device, receives the time multiplexed control signal through the third receiver by synchronized with the differential type pixel clock received by the first receiver, extracts the plurality of control signals from the time multiplexed control signal, and performs a driving control of the electro-optic device, wherein the control circuit includes a unit that extracts a command designating a driving mode of the electro-optic device within a vertical scanning period or a horizontal scanning period from the time multiplexed control signal and performs a driving control of the electro-optic device in the driving mode indicated by the extracted command.

2. The driving integrated circuit according to claim 1, wherein the control circuit includes a unit that extracts a control signal indicating a vertical synchronization timing of the electro-optic device as the control signal from the time multiplexed control signal and generates a vertical synchronization signal for the electro-optic device.

3. The driving integrated circuit according to claim 2, wherein the control circuit extracts a control signal by concatenating an additional signal designating the driving mode of the electro-optic device and the vertical synchronization signal, supplies the vertical synchronization signal to the electro-optic device, and performs a driving control of the electro-optic device in the driving mode indicated by the additional signal included in the control signal in the next vertical scanning period of the vertical scanning period started by the vertical synchronization signal.

4. The driving integrated circuit according to claim 2, wherein the control circuit extracts a control signal by concatenating an additional signal designating the driving mode of the electro-optic device and the vertical synchronization signal, supplies the vertical synchronization signal to the electro-optic device, and performs a driving control of the electro-optic device in the driving mode indicated by the additional signal included in the control signal in the vertical scanning period started by the vertical synchronization signal.

5. The driving integrated circuit according to claim 1, wherein the control circuit includes a unit that extracts a control signal indicating a horizontal synchronization timing of the electro-optic device as the control signal from the time multiplexed control signal and generates a horizontal synchronization signal for the electro-optic device.

6. The driving integrated circuit according to claim 5, wherein the control circuit extracts a control signal by concatenating an additional signal and the horizontal synchronization signal designating a driving mode of the electro-optic device, supplies the horizontal synchronization signal to the electro-optic device, and performs a driving control of the electro-optic device in the driving mode indicated by the additional signal included in the control signal in the next horizontal scanning period of the horizontal scanning period started by the horizontal synchronization signal.

7. The driving integrated circuit according to claim 6, wherein the additional signal is information designating the scanning line that is a driving target of the plurality of scanning lines provided in the electro-optic device.

8. The driving integrated circuit according to claim 5, wherein the control circuit extracts a control signal by concatenating an additional signal and the horizontal synchronization signal designating the driving mode of the electro-optic device, supplies the horizontal synchronization signal to the electro-optic device, and performs a driving control of the electro-optic device in the driving mode indicated by the additional signal included in the control signal in the horizontal scanning period started by the horizontal synchronization signal.

9. The driving integrated circuit according to claim 1, wherein the electro-optic device includes a plurality of pixel circuits including a pixel electrode and a common electrode to which a gradation voltage based on the pixel signal is applied, and an electro-optic element interposed between the pixel electrode and the common electrode, and wherein the control circuit extracts a command indicating a polarity of the gradation voltage as the command designating the driving mode of the electro-optic device from the time multiplexed control signal is applied, and performs a control of the electro-optic device for applying the gradation voltage of the polarity indicated by the extracted command between the pixel electrode and the common electrode.

10. The driving integrated circuit according to claim 1, wherein the electro-optic device includes a plurality of pixel circuits including a pixel electrode and a common electrode to which a gradation voltage based on the pixel signal is applied, and an electro-optic element interposed between the pixel electrode and the common electrode, and wherein the control circuit extracts a command indicating gradation inversion as the command designating the driving mode of the electro-optic device from the time multiplexed control signal, and performs a control of the electro-optic device for applying a gradation voltage representing the gradation obtained by inverting the gradation indicated by the differential type image signal between the pixel electrode and the common electrode.

11. The driving integrated circuit according to claim 1, wherein the control circuit extracts a command indicating vertical inversion display as the control signal designating the driving mode of the electro-optic device from the time multiplexed control signal, and performs a control for displaying an image obtained by vertically inverting an image indicated by the differential type image signal on the electro-optic device.

12. The driving integrated circuit according to claim 1, wherein the control circuit extracts a command indicating horizontal inversion display as the command designating the driving mode of the electro-optic device from the time multiplexed control signal, and performs a control for displaying an image obtained by horizontally inverting an image indicated by the differential type image signal on the electro-optic device.

13. The driving integrated circuit according to Claim 1, wherein the control circuit includes a unit that performs a periodical update control of a driving condition of the electro-optic device, and a synchronization unit that extracts a synchronization command designating a content of a driving condition that is a target of the periodical update control as a command designating the driving mode of the electro-optic device, and sets the content of the driving condition that is the target of the periodical update control to the content indicated by the extracted synchronization command.

14. The driving integrated circuit according to claim 1, wherein the electro-optic device includes a pixel unit that includes a plurality of scanning lines and a plurality of signal lines intersecting with each other and including a plurality of pixel circuits disposed corresponding to the intersections of the plurality of scanning lines and the plurality of signal lines, and a scanning line driving circuit that sequentially selects the plurality of scanning lines within one vertical scanning period and connects the plurality of pixel circuits corresponding to the intersections of the selected scanning lines and the plurality of signal lines to the plurality of signal lines, wherein the driving integrated circuit includes a signal line driving circuit that divides the plurality of signal lines into a plurality of wiring blocks, sequentially selects the signal lines belonging to the wiring block within one horizontal scanning period for each wiring block, and applies the gradation voltage to the selected signal lines, and wherein the control circuit of the driving integrated circuit includes a unit that performs a periodical update control of a sequence of applying gradation voltages to the plurality of signal lines in the wiring block of the plurality of wiring blocks, and a synchronization unit that extracts a synchronization command designating the sequence of applying the gradation voltages to the plurality of signal lines as a command designating the driving mode of the electro-optic device and sets the sequence of applying the gradation voltages to the plurality of signal lines that are the target of the periodical update control to the application sequence indicated by the extracted synchronization command.

15. The driving integrated circuit according to claim 1, wherein the command includes an address representing a kind of driving condition and data representing a driving content in the driving condition, and wherein the control circuit extracts only the command having a predetermined address from the time multiplexed control signal.

16. The driving integrated circuit according to claim 1, wherein the control circuit includes a unit that extracts various commands from the time multiplexed control signal and drives the electro-optic device according to the extracted commands, and outputs a vertical synchronization signal to the electro-optic device according to the extraction of the command indicating the vertical synchronization timing of the electro-optic device.

17. The driving integrated circuit according to claim 1, wherein the control circuit includes a unit that extracts various commands from the time multiplexed control signal and drives the electro-optic device according to the extracted commands, and outputs a vertical synchronization signal to the electro-optic device according to the extraction of the command indicating the vertical synchronization timing of the electro-optic device.

18. The driving integrated circuit according to claim 1, wherein the control circuit includes a unit that stops supplying power to the second receiver until a next horizontal scanning period is started when the reception of the differential type image signal of one horizontal scanning period by the second receiver is completed during one horizontal scanning period.

19. An electronic apparatus comprising:

an electro-optic device;

the driving integrated circuit that performs the driving control of the electro-optic device according to claim 1; and a host CPU that supplies the differential type pixel clock, the differential type image signal, and the time division multiplexed control signal to the driving integrated circuit.

* * * * *